(12) United States Patent
Yang et al.

(10) Patent No.: US 9,554,377 B2
(45) Date of Patent: *Jan. 24, 2017

(54) APPARATUS AND METHOD OF AVOIDING CONTROL CHANNEL BLOCKING

(71) Applicant: LG ELECTRONICS INC., Seoul (KR)

(72) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,384

(22) Filed: Nov. 15, 2013

(65) Prior Publication Data

US 2014/0153506 A1 Jun. 5, 2014

Related U.S. Application Data

(63) Continuation of application No. 13/513,072, filed as application No. PCT/KR2010/009076 on Dec. 17, 2010, now Pat. No. 8,634,374.

(Continued)

(51) Int. Cl.
*H04W 72/04* (2009.01)
*H04L 1/00* (2006.01)
*H04L 5/00* (2006.01)

(52) U.S. Cl.
CPC .......... *H04W 72/042* (2013.01); *H04L 1/0046* (2013.01); *H04L 1/0067* (2013.01);

(Continued)

(58) Field of Classification Search
None
See application file for complete search history.

(56) References Cited

U.S. PATENT DOCUMENTS 6,493,331 B1 12/2002 Walton et al.
8,433,251 B2 4/2013 Chen et al.
(Continued)

FOREIGN PATENT DOCUMENTS

CN 1885759 A 12/2006
EP 1 895 697 A1 3/2008
(Continued)

OTHER PUBLICATIONS

CATT, "DL Control Channel Scheme for LTE-A," 3GPP TSG RAN WG1 Meeting #55bis, R1-090191, Ljubljana, Slovenia, Jan. 12-16, 2009, 5 pages.

(Continued)

*Primary Examiner* — Warner Wong
(74) *Attorney, Agent, or Firm* — Birch, Stewart, Kolasch & Birch, LLP

(57) ABSTRACT

The present application is directed to a wireless communication system and, more particularly, a method of processing a control channel at a user equipment in a wireless communication system using multiple carriers. The method comprises receiving a plurality of search spaces, wherein each search space comprises a plurality of control channel candidates and each search space is corresponding to respective carrier. The method also includes monitoring the control channel candidates for the control channel.

16 Claims, 24 Drawing Sheets

Related U.S. Application Data

(60) Provisional application No. 61/287,700, filed on Dec. 17, 2009, provisional application No. 61/293,211, filed on Jan. 8, 2010, provisional application No. 61/299,355, filed on Jan. 29, 2010.

(52) U.S. Cl.
CPC ............ *H04L 5/001* (2013.01); *H04L 5/0053* (2013.01); *H04L 5/0073* (2013.01); *H04L 5/0094* (2013.01); *H04W 72/0406* (2013.01)

(56) References Cited

U.S. PATENT DOCUMENTS

| | | | |
|---|---|---|---|
| 8,441,996 | B2 | 5/2013 | Kim et al. |
| 8,626,218 | B2* | 1/2014 | Wang ................. H04L 5/003 370/241 |
| 8,681,708 | B2 | 3/2014 | Wang et al. |
| 8,934,417 | B2* | 1/2015 | Nory ................. H04W 72/1289 370/329 |
| 2009/0088148 | A1 | 4/2009 | Chung et al. |
| 2009/0300456 | A1* | 12/2009 | Pelletier ................. H04L 1/1812 714/749 |
| 2010/0232373 | A1* | 9/2010 | Nory et al. ..................... 370/329 |
| 2010/0254268 | A1* | 10/2010 | Kim et al. ..................... 370/241 |
| 2010/0254329 | A1* | 10/2010 | Pan ........................ H04L 5/001 370/329 |
| 2010/0260124 | A1 | 10/2010 | Noshio et al. |
| 2010/0302983 | A1* | 12/2010 | McBeath ............. H04L 5/0005 370/311 |
| 2010/0303011 | A1* | 12/2010 | Pan et al. ..................... 370/328 |
| 2010/0317360 | A1* | 12/2010 | McBeath ............. H04L 5/0091 455/450 |
| 2011/0070845 | A1* | 3/2011 | Chen ..................... H04L 5/001 455/91 |
| 2011/0076962 | A1* | 3/2011 | Chen ..................... H04L 5/001 455/68 |
| 2011/0085513 | A1* | 4/2011 | Chen ................. H04W 72/042 370/330 |
| 2011/0299489 | A1 | 12/2011 | Kim et al. |
| 2012/0044921 | A1* | 2/2012 | Chung ................. H04J 11/0069 370/338 |
| 2012/0078933 | A1* | 3/2012 | Kim ..................... H04L 5/0007 707/758 |
| 2013/0010619 | A1* | 1/2013 | Fong et al. ..................... 370/252 |
| 2013/0051214 | A1* | 2/2013 | Fong et al. ..................... 370/216 |
| 2013/0114545 | A1 | 5/2013 | Papsakellariou et al. |

FOREIGN PATENT DOCUMENTS

| | | |
|---|---|---|
| EP | 1 973 362 A2 | 9/2008 |
| JP | 2013-506383 A | 2/2013 |
| RU | 2 264 036 C2 | 10/2004 |
| WO | WO 2009/041779 A1 | 4/2009 |
| WO | WO 2009/057283 A1 | 5/2009 |
| WO | WO 2009/099271 A1 | 8/2009 |
| WO | WO 2011/038405 A2 | 3/2011 |

OTHER PUBLICATIONS

QUALCOMM Europe, "Clarifications of PDCCH Search Space," 3GPP TSG-RAN WG1 #53bis, R1-082543, Jun. 30-Jul. 4, 2008, Warsaw, Poland, pp. 1-5.
"Panasonic," Component Carrier Inidcation Scheme for Carrier Aggregation, 3GPP TSG-RAN WG1, Meeting #58, Agenda Item 15.4, R1-093465, Aug. 24-28, 2009, Shenzhen, China, 3 pages.
LG Electronics Inc., "Construction of PDCCH Search Spaces for Cross-Carrier Scheduling in Multiple Carrier Aggregation," 3GPP TSG RAN WG1 #59bis, Agenda Item 7.1.5, R1-100214, Jan. 18-22, 2010, Valencia, Spain, 4 pages.
LG Electronics, Configuration and Activation of Carrier Indicator in PDCCH for Multiple Carrier Aggregation, 3GPP TSG RAN WG1 #58bis, Agenda Item 7.2.2.3, R1-094161, Oct. 12-16, 2009, Miyazaki, Japan, 6 pages.
NEC Group, "Downlink Cross-Carrier Control Structure for LTE-Advanced," 3GPP TSG-RAN WG1 Meeting #58bis, Agenda Item 7.2.2.3, R1-093860, Oct. 12-16, 2009, Miyazaki, Japan, 3 pages.
ZTE, "PDCCH Designing Issues for LTE-A," 3GPP TSG-RAN WG1 Meeting #59, Agenda Item 7.2.2.1, R1-094736, Nov. 9-13, 20109, Juju, Korea, 4 pages.
QUALCOMM Europe, "Interpreting the Carrier Indicator Field," 3GPP TSG RAN WG1 #59, R1-094862, Jeju, Korea, Nov. 9-13, 2009, pp. 1-5.
Texas Instruments, "PDCCH Carrier Indication Field for Cross-Carrier Scheduling," 3GPP TSG RAN WG1 #59, R1-094761, Jeju, Korea, Nov. 9-13, 2009, pp. 1-4.
Texas Instruments, "Views on cross-carrier resource assignment," 3GPP TSG RAN WG1 #58, R1-093595, Shenzhen, China, Aug. 24-28, 2009, pp. 1-2.
ZTE, "Considerations on Carrier Indicator," 3GPP TSG-RAN WG1 meeting #58, R1-093207, Shenzhen, China, Aug. 24-28, 2009, pp. 1-3.
Panasonic, "Discussion on PDCCH with carrier indicator," 3GPP TSG-RAN WG1 Meeting #59, Jeju, Korea, Nov. 9-13, 2009, R1-094496, p. 1-3 (4 pages).
Samsung, "Configuration of Carrier Indicator Information Element," 3GPP TSG RAN WG1 #59, Jeju, Korea, Nov. 9-13, 2009, R1-094568, p. 1-4 (5 pages).

* cited by examiner

Case 1: All search spaces are shared

Case 2: Search spaces are partially shared

APPARATUS AND METHOD OF AVOIDING CONTROL CHANNEL BLOCKING

This application is a Continuation of co-pending application Ser. No. 13/513,072 filed on May 31, 2012, which is the National Phase of PCT/KR2010/009076 filed on Dec. 17, 2010, which claims priority under 35 U.S.C. 119(e) to U.S. Provisional Application Nos. 61/287,700 filed on Dec. 17, 2009, 61/293,211 filed on Jan. 8, 2010 and 61/299,355 filed on Jan. 29, 2010. The entire contents of all of the above applications are hereby incorporated by reference.

BACKGROUND

Field of the Invention

The present invention is directed to a wireless communication system, particularly apparatus and method of avoiding control channel blocking.

Discussion of the Related Art

Radio communication systems have been diversified in order to provide various types of communication services such as voice or data services. In general, a radio communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

SUMMARY OF THE INVENTION

An object of the present invention devised to solve the problem lies on a method and apparatus for avoiding control channel blocking in a radio communication system supporting carrier aggregation.

Another object of the present invention devised to solve the problem lies on a method and apparatus for efficiently performing blind decoding of a control channel.

A further object of the present invention devised to solve the problem lies on a method and apparatus for constructing a search space so as to efficiently transmit a control channel.

In a first aspect of the invention, a method of receiving a control channel at a user equipment in a wireless communication system using multiple carriers is provided, in which the method comprises: receiving a plurality of search spaces, wherein each search space comprises a plurality of control channel candidates and each search space is corresponding to respective carrier; and monitoring the control channel candidates for the control channel, wherein if the control channel candidates have a common information size over two or more search spaces, the control channel can be received via any one of the two or more the search spaces.

In a second aspect of the invention, an user equipment adapted to receive a control channel in a wireless communication system using multiple carriers is provided, in which the user equipment comprises: a radio frequency (RF) unit; and a processor, wherein the processor is adapted to receive a plurality of search spaces, wherein each search space comprises a plurality of control channel candidates and each search space is corresponding to respective carrier, and to monitor the control channel candidates for the control channel, wherein if the control channel candidates have a common information size over two or more search spaces, the control channel can be received via any one of the two or more search spaces.

Preferably, if the control channel candidates have the common information size over the two or more search spaces, the monitoring is performed on an assumption that the control channel candidates having the common information size can be received via any one of the two or more search spaces.

Preferably, the control channel candidates having the common information size are discriminated using CIF (Carrier Indicator Field) values.

Preferably, if the control channel candidates have different information sizes over the plurality of search spaces, the control channel is received via only one search space that is corresponding to a carrier related with the control channel.

Preferably, the plurality of search spaces are received via a same carrier, and the control channel includes a CIF (Carrier Indicator Field) value used for indicating a related carrier.

Preferably, the control channel is CRC (Cyclic Redundancy Check) scrambled with RNTI (Radio Network Temporary Identifier).

Preferably, the plurality of search spaces are user equipment specific search spaces.

Preferably, the information size includes a DCI (downlink control information) payload size.

Preferably, the monitoring includes decoding each of the control candidates for the control channel.

Preferably, the above aspects further include performing an operation in accordance with the control channel.

In a third aspect of the invention, a method of transmitting a control channel at a network node in a wireless communication system using multiple carriers is provided, in which the method comprises: constituting a plurality of search spaces, wherein each search space comprises a plurality of control channel candidates and each search space is corresponding to respective carrier; and transmitting the control channel via the plurality of search spaces, wherein if the control channel candidates have a common information size over two or more search spaces, the control channel can be transmitted via any one of the two or more search spaces.

In a fourth aspect of the invention, a network equipment adapted to transmit a control channel in a wireless communication system using multiple carriers is provided, in which the network equipment comprises: a radio frequency (RF) unit; and a processor, wherein the processor is adapted to constitute a plurality of search spaces, wherein each search space comprises a plurality of control channel candidates and each search space is corresponding to respective carrier, and to transmit the control channel via the plurality of search spaces, wherein if the control channel candidates have a common information size over two or more search spaces, the control channel can be transmitted via any one of the two or more search spaces.

Preferably, if the control channel candidates have the common information size over the two or more search spaces, the control channel candidates having the common information size can be transmitted via any one of the two or more search spaces.

Preferably, the control channel candidates having the common information size are discriminated using CIF (Carrier Indicator Field) values.

Preferably, if the control channel candidates have different information sizes over the plurality of search spaces, the control channel is transmitted via only one search space that is corresponding to a carrier related with the control channel.

Preferably, the plurality of search spaces are transmitted via a same carrier, and the control channel includes a CIF (Carrier Indicator Field) value used for indicating a related carrier.

Preferably, the control channel is CRC (Cyclic Redundancy Check) scrambled with RNTI (Radio Network Temporary Identifier).

Preferably, the plurality of search spaces are user equipment specific search spaces.

Preferably, the information size includes a DCI (downlink control information) payload size.

According to the present invention, it is possible to avoid control channel blocking in a radio communication system supporting carrier aggregation. In addition, it is possible to efficiently perform blind decoding of a control channel. In addition, it is possible to efficiently constitute a search space.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

The following technologies may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rate for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS) standard. A 3$^{rd}$ Generation Partnership Project Long Term Evolution (3GPP LTE) communication system is part of the E-UMTS (Evolved UMTS) standard, which employs an OFDMA system in downlink and employs an SC-FDMA system in uplink. LTE-A (Advanced) is an evolved version of 3GPP LTE.

In order to clarify the description, the 3GPP LTE/LTE-A will be focused upon, but the technical scope of the present invention is not limited thereto. It should be noted that specific terms disclosed in the present invention are proposed for convenience of description and better understanding of the present invention and these terms may be replaced with other terms within the technical scope or spirit of the present invention.

Figure 1:
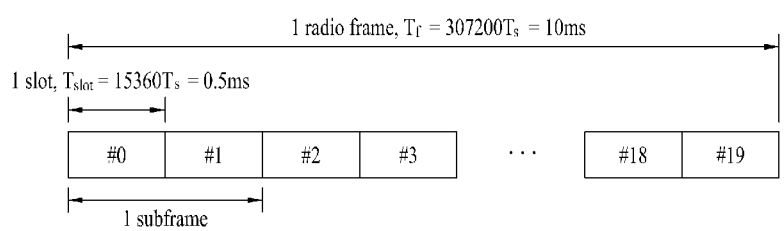
FIG. 1 is a diagram showing an exemplary structure of a radio frame of a 3$^{rd}$ Generation Partnership Project (3GPP) system.

FIG. 1 shows an exemplary structure of radio frame.

Referring to FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 2:
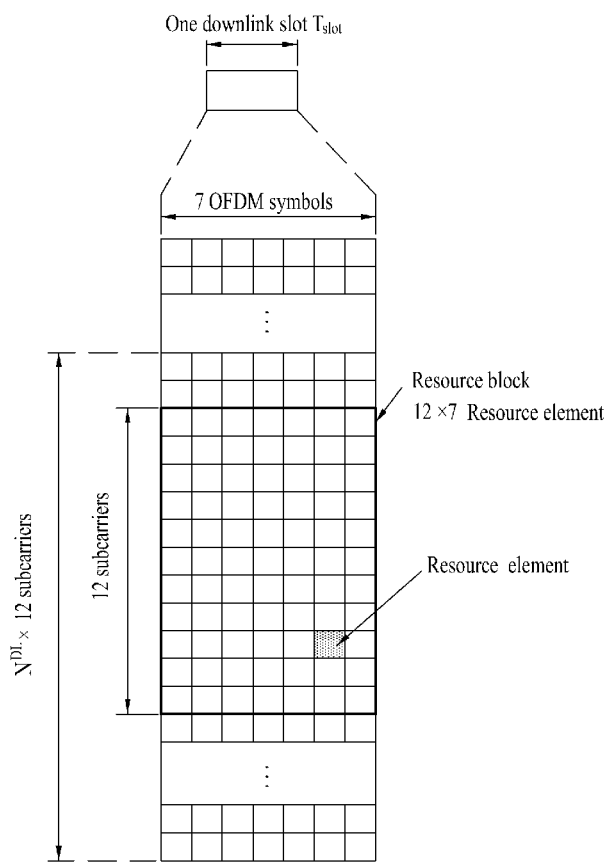
FIG. 2 is a diagram showing a resource grid for a downlink slot.

FIG. 2 shows a resource grid for one downlink slot.

Referring to FIG. 2, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 3:
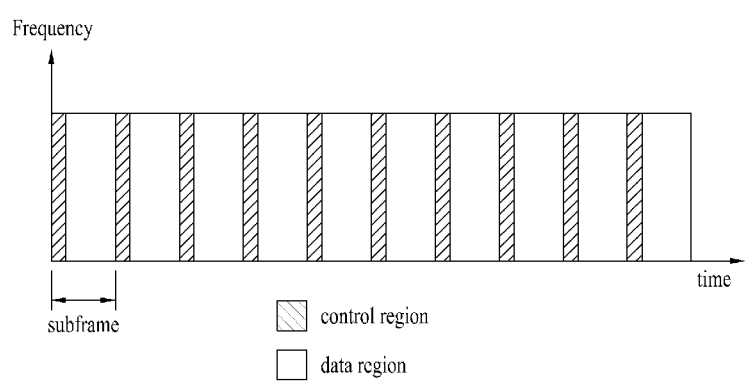
FIG. 3 is a diagram showing an exemplary structure of a downlink frame.

FIG. 3 shows an exemplary structure of downlink structure.

Referring to FIG. 3, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

A PDCCH carries a message known as Downlink Control Information (DCI), which includes resource assignments and other control information for a UE or group of UEs. In general, several PDCCHs can be transmitted in a subframe. Each PDCCH is transmitted using one or more so-called Control Channel Elements (CCEs), where each CCE corresponds to nine sets of four physical resource elements known as Resource Element Groups (REGs). Four QPSK symbols are mapped to each REG. The resource elements occupied by reference symbols are not included within the REGs, which means that the total number of REGs in a given OFDM symbol depends on whether or not cell-specific reference signals are present. The concept of REGs (i.e. mapping in groups of four resource elements) is also used for the other downlink control channels (the PCFICH and PHICH). Four PDCCH formats are supported, as listed in Table 1.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered and used consecutively, and, to simplify the decoding process, a PDCCH with a format consisting of n CCEs may only start with a CCE with a number equal to a multiple of n. The number of CCEs used for transmission of a particular PDCCH is determined by the base station according to the channel conditions. For example, if the PDCCH is intended for a UE with a good downlink channel (e.g. close to the base station), then one CCE is likely to be sufficient. However, for a UE with a poor channel (e.g. near the cell border) then eight CCEs may be required in order to achieve sufficient robustness. In addition, the power level of a PDCCH may be adjusted to match the channel conditions.

The approach adopted for LTE is to define for each UE a limited set of CCE locations where a PDCCH may be placed. The set of CCE locations in which the UE may find its PDCCHs can be considered as a 'search space'. In LTE the search space is a different size for each PDCCH format. Moreover, separate dedicated (UE-specific) and common search spaces are defined, where a dedicated search space is configured for each UE individually, while all UEs are informed of the extent of the common search space. Note that the dedicated and common search spaces may overlap for a given UE. With such small search spaces it is quite possible in a given subframe that the base station cannot find CCE resources to send PDCCHs to all the UEs that it would like to, because having assigned some CCE locations the remaining ones are not in the search space of a particular UE. To minimize the possibility of such blocking persisting into the next subframe, a UE-specific hopping sequence is applied to the starting positions of the dedicated search spaces. The sizes of the common and dedicated search spaces are listed in Table 2.

TABLE 2

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to keep under control the computational load arising from the total number of blind decoding (BD) attempts, the UE is not required to search for all the defined DCI formats simultaneously. Typically, in the dedicated search space, the UE will always search for Formats 0 and 1A, which are both the same size and are distinguished by a flag in the message. In addition, a UE may be required to receive a further format (i.e. 1, 1B or 2, depending on the PDSCH transmission mode configured by the base station). In the common search space the UE will search for Formats 1A and 1C. In addition the UE may be configured to search for Format 3 or 3A, which have the same size as formats 0 and 1A, and may be distinguished by having the CRC scrambled by a different (common) identity, rather than a UE-specific one. The transmission mode for configuring the multi-antenna technique and the information content of the different DCI formats are listed below.

Transmission Mode
Transmission Mode 1: Transmission from a single base station antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Transmission using UE-specific reference signals DCI format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Formats 3/3A: Power control commands for PUCCH and PUSCH with 2-bit/1-bit power adjustments Considering the above, the UE would be required to carry out a maximum of 44 BDs in any subframe. This does not include checking the same message with different CRC values, which requires only a small additional computational complexity.

Figure 4:
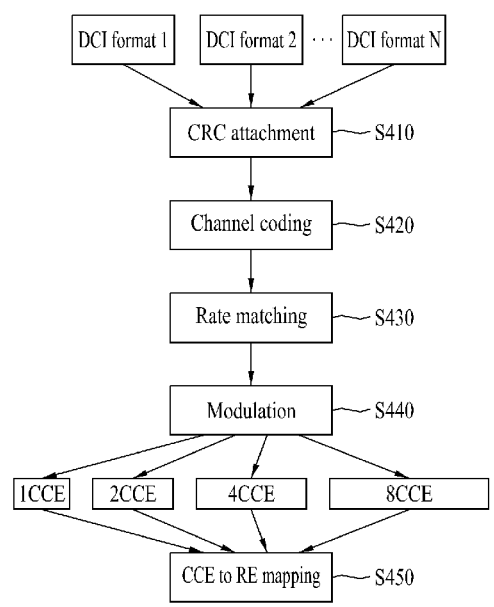
FIG. 4 is a flowchart illustrating a process of constituting a PDCCH at a base station (BS).

FIG. 4 is a flowchart illustrating a process of constituting a PDCCH at a base station (BS).

Referring to FIG. 4, the BS generates control information according to a DCI format. The BS may select one from among a plurality of available DCI formats (DCI formats 1, 2, . . . , and N) according to control information to be transmitted to a UE. In step S410, a Cyclic Redundancy Check (CRC) for error detection is attached to the control information generated according to each DCI format. The CRC is masked with a Radio Network Temporary Identifier (RNTI) according to an owner or usage of a PDCCH. In other words, the PDCCH is CRC-scrambled with an identifier (e.g., an RNTI).

Table 3 shows an example of identifiers masked to the PDCCH.

TABLE 3

| Type | Identifier | Description |
| --- | --- | --- |
| UE-specific | C-RNTI, temporary | used for a unique UE identification |

TABLE 3-continued

| Type | Identifier | Description |
| --- | --- | --- |
| Common | C-RNTI, semi-persistent C-RNTI P-RNTI SI-RNTI RA-RNTI | used for paging message used for system information used for random access response |

If a C-RNTI, a temporary C-RNTI or a semi-persistent C-RNTI is used, the PDCCH carries control information for a specific UE and, if the other RNTI is used, the PDCCH carries common control information received by all UEs within a cell. In step S420, channel coding is performed with respect to the control information to which the CRC is attached so as to generate coded data. In step S430, rate matching according to a CCE aggregation level assigned to a PDCCH format is performed. In step S440, the coded data is modulated so as to generate modulation symbols. The CCE aggregation level of the modulation symbols constituting one PDCCH may be any one of 1, 2, 4 and 8. In step S450, the modulation symbols are mapped to physical Resource Elements (RE).

Figure 5:
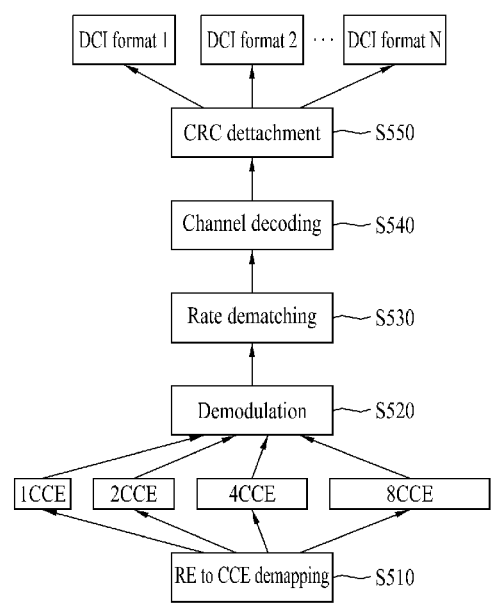
FIG. 5 is a flowchart illustrating a process of processing a PDCCH at a user equipment (UE).

FIG. 5 is a flowchart illustrating a method of processing a PDCCH at a user equipment (UE).

Referring to FIG. 5, in step S510, the UE demaps physical REs from CCEs. In step S520, since the UE does not know the CCE aggregation level of the received PDCCH, the UE performs demodulation at each CCE aggregation level. In step S530, the UE performs rate dematching with respect to the demodulated data. Since the UE does not know the DCI format (or DCI payload size) of the received control information, rate dematching is performed with respect to DCI formats (or DCI payload sizes). In step S540, channel decoding is performed with respect to the rate-dematched data according to a code rate and a CRC is checked so as to detect errors. If no errors are detected, it means the UE detects its own PDCCH. If an error is detected, the UE continuously performs blind decoding with respect to the other CCE aggregation levels or the other DCI formats (or DCI payload sizes). In step S550, the UE which detects its own PDCCH removes the CRC from the decoded data so as to acquire control information.

A plurality of PDCCHs for a plurality of UEs may be transmitted within a control region of the same subframe. The BS does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCH candidates according to respective DCI formats. This is referred to as blind decoding (blind detection). Through blind decoding, the UE simultaneously performs identification of the PDCCH transmitted to the UE and decoding of the control information transmitted through the corresponding PDCCH. For example, in the case where the PDCCH is demasked using the C-RNTI, no CRC error detection means that the UE detects its own PDCCH.

In order to reduce overhead of blind decoding, the number of DCI formats is set to be less than the number of types of control information transmitted using the PDCCH. The DCI format includes a plurality of different fields. The type of the field, the number of fields, and the bit number of each field varies according to the DCI format. In addition, the size of the control information matched to the DCI format varies according to the DCI format. A certain DCI format may be used for transmission of two types of control information.

Table 4 shows an example of control information transmitted by DCI Format 0. The lengths in bits of the following fields are exemplary and nonlimiting.

TABLE 4

| Field | bit(s) |
| --- | --- |
| (1) Flag for format0/format1A differentiation | 1 |
| (2) Hopping flag | 1 |
| (3) Resource block assignment and hopping resource Allocation | $\lceil \log_2(N_{RB}^{UL}(N_{RB}^{UL} + 1)/2) \rceil$ |
| (4) Modulation and coding scheme and redundancy Version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

A flag field serves to differentiate Format 0 from Format 1A. That is, DCI Formats 0 and 1A have the same payload size and are differentiated by the flag field. The length in bits of a resource block assignment and hopping resource allocation field may vary according to a hopping PUSCH or a non-hopping PUSCH. The resource block assignment and hopping resource allocation field for the non-hopping PUSCH provides $\lceil \log_2(N_{RB}^{UL}(N_{RB}^{UL}+1)/2) \rceil$ bits to resource allocation of a first slot within an uplink subframe. $N_{RB}^{UL}$ denotes the number of RBs included in an uplink slot and depends on an uplink transmission bandwidth set in a cell. Accordingly, the payload size of DCI Format 0 may vary according to uplink bandwidth. DCI Format 1A includes a field for PDSCH assignment and the payload size of DCI Format 1A may vary according to downlink bandwidth. The DCI format 1A provides a reference information bit size to DCI format 0. Accordingly, if the number of information bits of DCI Format 0 is less than the number of information bits of DCI Format 1A, "0" is attached to DCI Format 0 until the payload size of DCI Format 0 becomes equal to the payload size of DCI Format 1A. A padding field of the DCI format is filled with "0".

Figure 6:
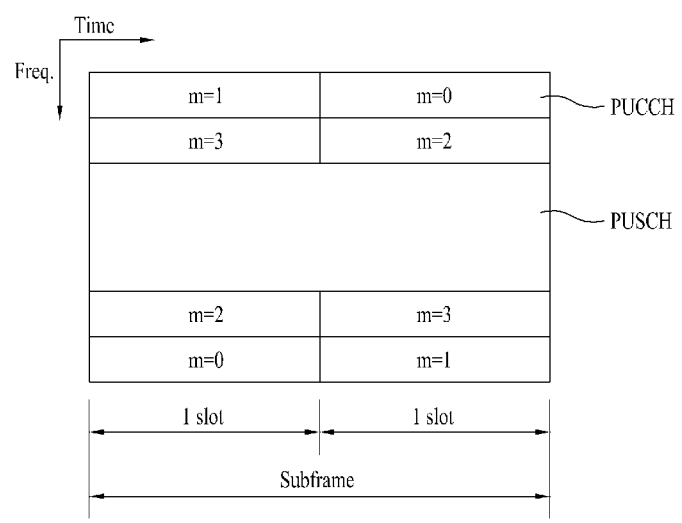
FIG. 6 is a diagram showing an exemplary structure of an uplink subframe.

FIG. 6 is a diagram showing an exemplary structure of an uplink subframe used in an LTE system.

Referring to FIG. 6, the uplink subframe includes a plurality of slots (e.g., two). Each slot may include SC-FDMA symbols, the number of which varies according to the length of a CP. For example, in the case of a normal CP, a slot may include seven SC-FDMA symbols. An uplink subframe is divided into a data region and a control region in a frequency region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on the frequency axis and hops between slots. The control information includes HARQ ACK/NACK, Channel Quality Information (CQI), Precoding Matrix Indicator (PMI) and Rank Indication (RI).

Figure 7:
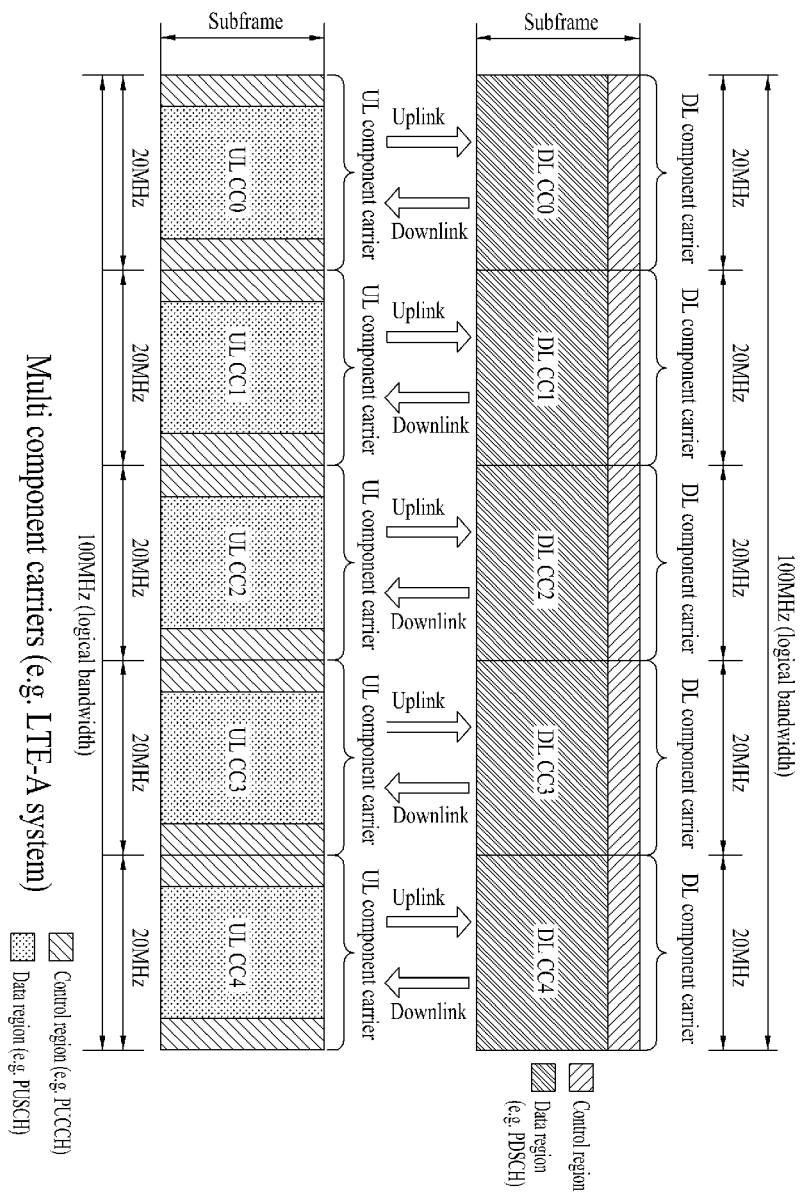
FIG. 7 is a diagram showing a Carrier Aggregation (CA) communication system.

FIG. 7 is a diagram showing a Carrier Aggregation (CA) communication system.

Referring to FIG. 7, a plurality of uplink/downlink Component Carriers (CCs) may be aggregated so as to support a wider uplink/downlink bandwidth. The CCs may be contiguous or non-contiguous in a frequency region. The bandwidths of the CCs are independently set. Asymmetric CA in which the number of UL CCs and the number of DL CCs are different is also possible. The control information may be set to be transmitted/received only through a specific CC. Such a specific CC may be referred to as a primary CC and the remaining CCs may be referred to as secondary CCs. For example, if cross-carrier scheduling (or cross-CC scheduling) is applied, a PDCCH for downlink assignment may be transmitted through DL CC#0 and a corresponding PDSCH may be transmitted through DL CC#2. The term "CC" may be replaced with other equivalent terms (e.g., carrier, cell and the like).

For cross-CC scheduling, the introduction of carrier indicator field (CIF) can be considered. Configuration for presence or absence of the CIF within PDCCH can be semi-statically and UE-specifically (or UE group-specifically) enabled by higher layer signaling (e.g., RRC signaling). The baseline of PDCCH transmission is summarized as below.

CIF disabled: PDCCH on a DL CC assigns PDSCH resources on the same DL CC and PUSCH resources on a single linked UL CC
    No CIF
    Same as LTE PDCCH structure (same coding, same CCE-based resource mapping) and DCI formats CIF enabled: PDCCH on a DL CC can assign PDSCH or PUSCH resources in one of multiple aggregated DL/UL CCs using the CIF
    LTE DCI formats extended with the CIF
    CIF (if configured) is a fixed x-bit field (e.g., x=3)
    CIF (if configured) location is fixed irrespective of DCI format size
    Reusing LTE PDCCH structure (same coding, same CCE-based resource mapping)
    Cross-CC resource assignments can be configured both when the DCI formats have the same or different sizes Explicit CIF for the case of same DCI format size
It would be determined whether the CIF is included or not in cases the DCI format sizes are different
There will be an upper limit on the total number of BDs In the case of presence of CIF, desirably, the base station may assign the PDCCH monitoring DL CC set for reduction of BD complexity at the UE side. This CC set is a portion of the entire aggregated DL CCs and the UE only performs detection/decoding of PDCCHs scheduled for it on this set. In other words, to schedule PDSCH/PUSCH for a UE, the base station transmits PDCCHs only through the PDCCH monitoring DL CC set. The PDCCH monitoring DL CC set may be set UE-specific or UE-group-specific or cell-specific.

Figure 8:
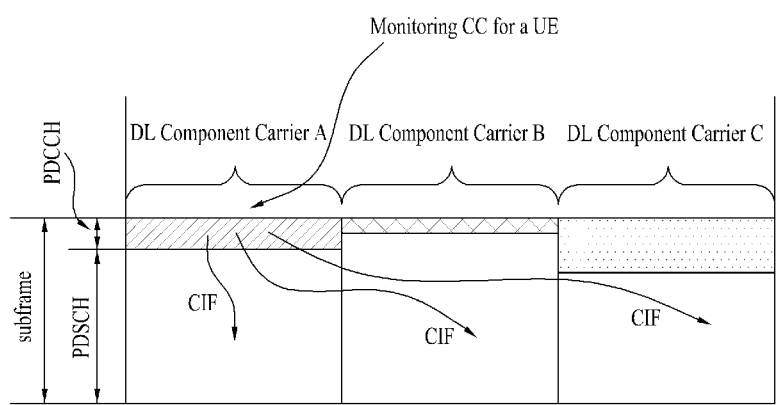
FIG. 8 is a diagram showing cross-carrier scheduling.

FIG. 8 shows an example of DL subframe for which 3 DL CCs are aggregated, and DL CC A is configured as the PDCCH monitoring DL CC. If the CIF is disabled, each DL CC can transmit only the PDCCH scheduling PDSCH of each DL CC without the CIF, by following the LTE PDCCH principle. On the other hand, if the CIF is enabled by UE-specific (or UE-group-specific or cell-specific) higher layer signaling, only DL CC A can transmit the PDCCHs scheduling not only PDSCH of DL CC A but also PDSCHs of the other CCs, by using the CIF. Note that no PDCCH is transmitted on DL CC B and C which are not configured as the PDCCH monitoring DL CC. The term "PDCCH monitoring DL CC" can be replaced with equivalent terms such as a monitoring carrier, a monitoring cell, a serving carrier, a serving cell.

Example

If cross-scheduling is not set in the CA system, a PDCCH for a specific carrier is transmitted only via the corresponding carrier. For example, referring to FIG. 7, if non-cross-CC scheduling is set, a PDCCH for DL CC0/UL CC0 is transmitted only via DL CC0. Accordingly, only a PDCCH search space for DL CC0/UL CC0 is present in DL CC0. That is, a PDCCH search space is constituted per carrier and each PDCCH search space is transmitted only via the corresponding DL CC.

However, as shown in FIG. 8, if cross-CC scheduling is set (that is, CIF is enabled), the monitoring DL CC must transmit not only a PDCCH associated with the monitoring DL CC but also PDCCHs associated with the other carriers. That is, the monitoring DL CC (DL CC A) must transmit all PDCCHs associated with DL CC A, DL CC B and DL CC C. Accordingly, the monitoring DL CC (DL CC A) must include a PDCCH search space associated with DL CC A, a PDCCH search space associated with DL CC B and a PDCCH search space associated with DL CC C. If CIF is set as described above, since a plurality of PDCCH search spaces must be defined in one DL CC, PDCCH blocking due to limited PDCCH resources and increase in the number of times that blind decoding is performed may occur. PDCCH blocking means that PDCCH scheduling for the corresponding carrier is limited due to limited PDCCH resources. For example, if a plurality of PDCCH search spaces is defined in one carrier, available resources of the PDCCH search space corresponding to each carrier may be limited due to limited PDCCH resources and thus a PDCCH assignment location may be limited or PDCCH assignment may be impossible.

Accordingly, if CIF is set, there is a need for a method of solving PDCCH blocking and blind decoding times increase. To this end, in the monitoring DL CC, the PDCCH search space may be newly defined differently from the conventional method. That is, the PDCCH search space may be newly defined to suit management of cross-CC scheduling. For example, the PDCCH search space may be defined over a plurality of carriers. However, if the PDCCH search space is newly defined, backward compatibility with the conventional system (e.g., LTE) is problematic. Moreover, since the payload size of the conventional DCI varies according to the carrier band even in the same format, the DCI structure needs to be changed in order to define DCIs within the unified PDCCH search space.

For this reason, the present invention proposes a method of solving PDCCH blocking and reducing the number of times that blind decoding is performed on the assumption that the PDCCH search space is defined on a per carrier basis. In more detail, the present invention proposes a method of constituting search spaces for blind decoding if a plurality of CCs is aggregated and cross-CC scheduling is possible. Cross-CC scheduling may be performed using CIF inserted into a PDCCH.

Hereinafter, the embodiment of the present invention will be described in detail with reference to the drawings. As described above, the transmission modes of the aggregated CCs may be independently set and the bandwidths of the CCs may be assigned per CC and thus may be the same or different from each other. Among all CCs aggregated per UE (group), one or a plurality of DL CCs may be set to a PDCCH monitoring DL CC for the UE (group). The PDCCH monitoring DL CC is arbitrarily defined in order to indicate a DL CC used to transmit a plurality of PDCCH search spaces corresponding to carriers upon cross-CC scheduling. The PDCCH monitoring DL CC may be replaced with other equivalent terms. For example, the term "PDCCH monitoring DL CC" can be replaced with equivalent terms such as a monitoring carrier, a monitoring cell, a serving carrier, a serving cell.

For convenience, although PDSCH scheduling of DL CCs is shown in the drawings, the present invention is equally applicable to PUSCH scheduling of UL CCs linked with DL CCs. For convenience, although a CCE aggregation level of 1 is shown in the drawings, the present invention is equally or similarly applicable to the case where the CCE aggregation level has other values (e.g., 2, 4, or 8). Although it is assumed that BDs for two DCI formats per PDCCH candidate can be performed similar to the conventional LTE system with respect to all cases in the present invention, BDs for one or three or more DCI formats per PDCCH candidate may be performed. For convenience, although symmetric CA in which the number of DL CCs and the number of UL CCs are the same is shown in the drawings, the present invention is equally or similarly applicable to asymmetric CA in which the number of DL CCs and the number of UL CCs are different. For convenience, although the case where DL CCs and UL CCs are linked in one-to-one correspondence is shown, the present invention is equally or similarly applicable to the case where DL CCs and UL CCs are linked in many-to-one correspondence or one-to-many correspondence.

Embodiment 1: Search Space Construction According to Information (e.g., DCI)

In the present method, if cross-carrier scheduling is possible in a state in which a plurality of carriers is aggregated, search spaces having control information having the same size are shared. In other words, search spaces having control information having the same size are aggregated as opposed to being divided on a per carrier basis. Accordingly, monitoring of control information having the same size in the control information associated with carriers may be performed within the same unified search space. In contrast, search spaces for control information having different sizes are divided on a per carrier basis. Accordingly, monitoring of control information having different sizes in the control information associated with carriers is performed only within the search space corresponding to the corresponding carrier.

According to the present method, if search spaces having control information having the same size are present, the sizes of the search spaces for monitoring the control information may be set to be large. Accordingly, it is possible to increase freedom in control channel scheduling and to solve control channel blocking.

Figure 9:
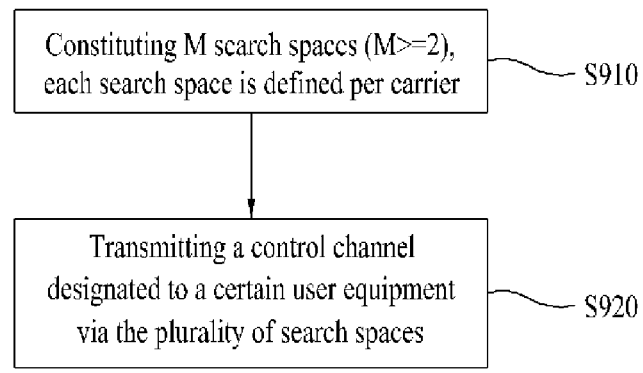
FIG. 9 is a diagram showing a method of constituting search spaces according to an embodiment of the present invention.

FIG. 9 is a diagram showing a method of transmitting a control channel to a specific UE at a BS.

Referring to FIG. 9, the BS constitutes a plurality of search spaces (S910). Each search space includes a plurality of control channel candidates and is defined per carrier (e.g., CC). The definition of the search spaces per CC may be performed according to the PDCCH search space constitution method of the conventional LTE system. A parameter (e.g., a hashing pattern, a location, a size, etc.) for a search space per CC may be obtained by a combination of a parameter for a PDCCH search space of the conventional LTE system and a CIF value.

The plurality of search spaces includes a UE-specific search space or a common search space and preferably includes a UE-specific search space. The control channel includes a PDCCH, and a control channel candidate includes a PDCCH candidate. The control channel carries a variety of control information and a variety of control information formats is present according to the type/content of the control information. Thereafter, the BS transmits the control channel for the specific UE via the plurality of search spaces (S920). The control channel (or the control information) may carry an identifier in order to indicate the specific UE. The identifier includes an RNTI, e.g., C-RNTI or SPS-RNTI. The control channel (or the control information) may be scrambled using the identifier. For example, the BS may transmit the PDCCH that is CRC-scrambled with the C-RNTI to the UE.

If cross-carrier scheduling is set, the plurality of search spaces is constituted on the same DL CC. Cross-carrier scheduling may be performed using the CIF within the control channel. The CIF may have a representative value (e.g., DL CC indication value) indicating a linked DL/UL CC pair or a value separately indicating DL CC or UL CC. The CIF may be represented by an absolute index or a relative index (e.g., offset).

The search spaces may be constituted per linked DL/UL CC pair, DL CC or UL CC. The search spaces may be contiguous in a logical index or may be independently set and the search spaces may partially or wholly overlap each other. The size of the search space corresponding to each carrier (or CIF) may be determined in proportion to a maximum number of PDCCHs transmittable via the search space or may be given weights or all the sizes of the search spaces may be the same. One control information format per DL CC or UL CC may be set or two or more control information formats per DL CC or UL CC may be set, in the search space corresponding to each carrier (or CIF). A DL/UL common control information format such as DCI Format 0/1A of the LTE system may be set in the search spaces. The type of the control information format set in the search spaces may vary according to the transmission mode (e.g., a MIMO mode).

When the search spaces are constructed, if control channel formats having the same size (or control information having the same size irrespective of the format) are present in the plurality of search spaces, the search spaces of the corresponding control channel formats are shared. If the number of search spaces constituted on one carrier is M (M≥2), N (N≤M) search spaces may be shared. The sharing/non-sharing of the search spaces or the number of search spaces may be determined per control channel format (or per control information size irrespective of the format). Accordingly, if the search spaces are constituted per carrier but the control formats having the same size (or the control information having the same size irrespective of the format) are present, the search spaces are unified. In this case, a control channel for the UE that is related with one of carriers (or CIF) corresponding to the shared N search spaces may be transmitted via any one of the N search spaces. That is, control channel candidates having the same size over the N search spaces may be transmitted via any one of the N search spaces. In this case, control channel candidates having the same size are discriminated using CIF (Carrier Indicator Field) values.

In contrast, if the sizes of the control channel formats are different per search space, the search spaces of the control channel formats are not shared. In this case, the control channel for the UE may be transmitted only via the search spaces corresponding to the corresponding carrier (or CIF). That is, control channel candidates with a same CIF are transmitted via only one search space corresponding to the CIF.

For example, the BS may constitute the search spaces per CC and compare the DCI (format) sizes for all the CCs. If DCIs (formats) having the same size are present, the BS may unify the search spaces of the DCIs (formats) so as to constitute an extended search space. Accordingly, PDCCHs for the DCIs (formats) having the same size may be transmitted via any PDCCH candidate within the extended search space, instead of via respective search spaces. In this case, PDCCH candidates within the extended search space are discriminated using CIF (Carrier Indicator Field) values.

Figure 10:
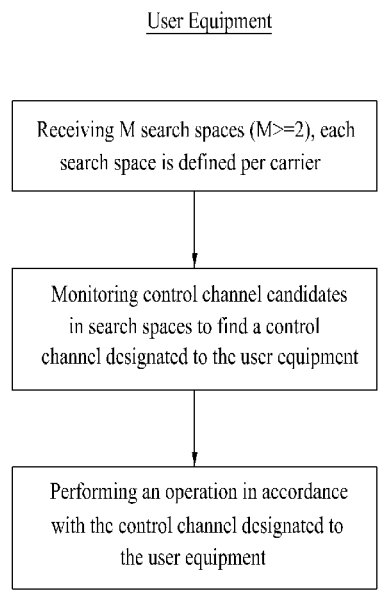
FIG. 10 is a diagram showing a method of processing a control channel according to an embodiment of the present invention.

FIG. 10 is a diagram showing an example of processing a control channel (e.g., a PDCCH) at a UE. The process of FIG. 10 corresponds to the process of FIG. 9 and the detailed description refers to the description of FIG. 9.

Referring to FIG. 10, the UE receives a plurality (M: M≥2) of search spaces (S1110). Each search space is defined per carrier. Thereafter, the UE monitors control channel candidates within the search spaces in order to find a control channel assigned to the UE (S1120). The monitoring process includes blind decoding each of the control channel candidates. Thereafter, the UE may perform an operation according to the control channel assigned to the UE (S1130).

At this time, if the control channel candidates have the same information size over N (N≤M) search spaces, a control channel for the UE that is related with one of carriers (or CIF) corresponding to the N search spaces may be received via any one of the N search spaces. Thus, the UE monitors control channel candidates on an assumption that the control channel candidates having the same information size can be received via any one of the N search spaces. In this case, the control channel candidates having the same information size are discriminated using CIF (Carrier Indicator Field) values.

In contrast, if the control channel candidates have different information sizes per search spaces, the control channel for the specific UE may be received only via the search space corresponding to the corresponding carrier (or CIF). That is, control channel candidates with a same CIF are transmitted via only one search space corresponding to the CIF.

Figure 11A:
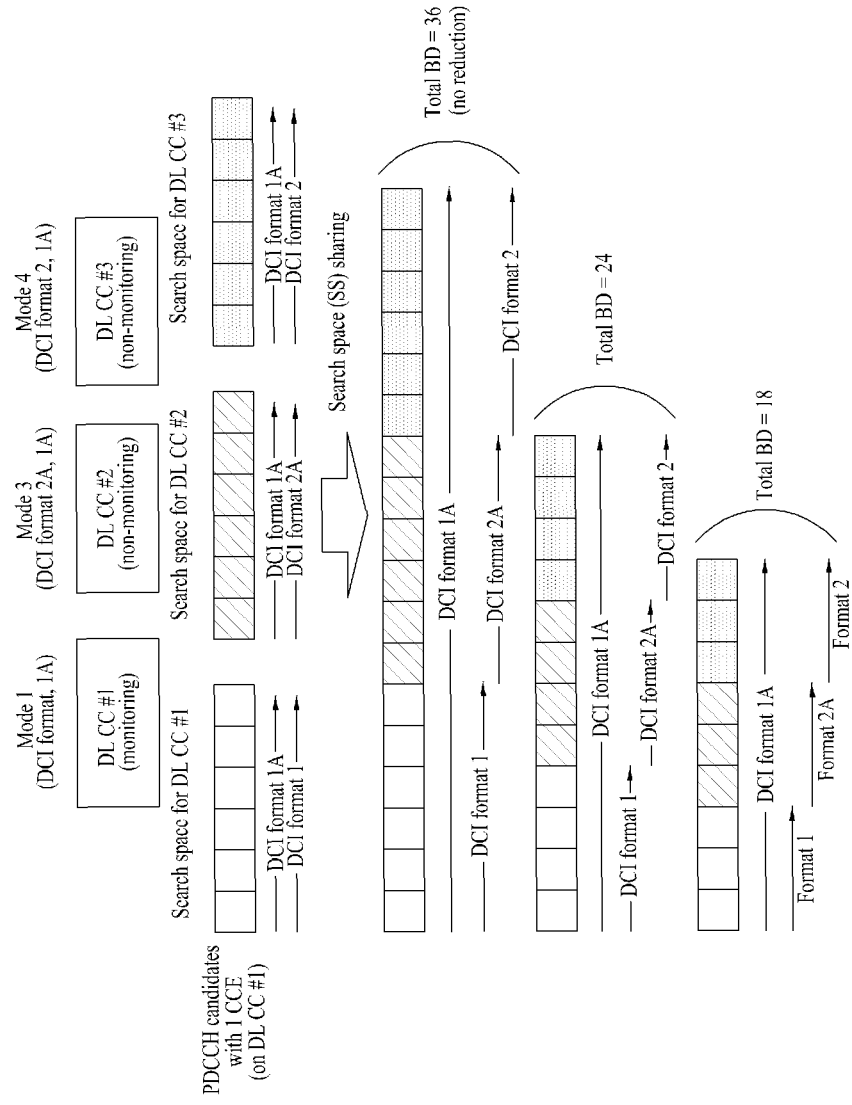
FIGS. 11A, 11B and 12 are diagrams showing examples of constituting search spaces in the case where one monitoring DL CC is used, according to an embodiment of the present invention.

FIG. 11A shows an example of constituting search spaces according to an embodiment of the present invention. In the present example, three DL CCs are aggregated and the transmission modes of DL CCs are set to 1, 3 and 4. For convenience, it is assumed that the bandwidths of all CCs are the same and DL CC #1 is a PDCCH monitoring DL CC. Although the number of times that BD is performed per DCI format is the same (BD is performed with respect to six PDCCH candidates similar to the LTE system) in the present example, the number of times that BD is performed may vary according to DCI formats.

Referring to FIG. 11A, the BS constitutes the search spaces per CC and compares the DCI format sizes for all CCs. As a result of this comparison, the sizes of DCI Formats 1A for three DL CCs are the same and DCI Formats 1, 2A and 2 respectively have different sizes. Accordingly, the BS unifies three search spaces for DCI Format 1A (search space sharing). Accordingly, the BS may transmit DCI Format 1A (CIF=DL CC #1) via the PDCCH candidate of any one of a search space for DL CC #1, a search space for DL CC #2 and a search space for DL CC #3. Similarly, DCI Format 1A (CIF=DL CC #2) and DCI Format 1A (CIF=DL CC #3) may be transmitted via the PDCCH candidate of any one of three search spaces. That is, DCI Format 1A candidates (CIF=DL CC #1, #2 or #3) can be transmitted via any one of search spaces for DL CC #1, #2 and #3. Thus, UE monitors PDCCH candidates on an assumption that DCI Format 1A candidates (CIF=DL CC #1, #2 or #3) can be received via any one of search spaces for DL CC #1, #2 and #3. In this case, DCI Format 1A candidates are discriminated using CIF values.

In contrast, since the DCI formats 1, 2A and 2 respectively have unique sizes, the search spaces for the DCI formats 1, 2A and 2 are not shared and are managed per CC. That is, DCI Format 1 (CIF=DL CC #1) may be transmitted only via the search space corresponding to DL CC #1. Similarly, DCI Format 2A (CIF=DL CC #2) and DCI Format 2 (CIF=DL CC #3) may be transmitted only via the search spaces corresponding to DL CC #2 and DL CC #3, respectively.

The following detailed description will take into consideration that the maximum BD times (MaxBD) may be limited. MaxBD=36 indicates that the number of times that BD is performed is not reduced compared with before the search spaces are shared. In the case of MaxBD=36, the BD for DCI Format 1A may be commonly performed via the search spaces including 18 (=6×3) PDCCH candidates of the unified and extended search space. In contrast, the BD for DCI Formats 1, 2A and 2 is performed via the search spaces including six PDCCH candidates.

If MaxBD is reduced to 24, the number of times that BD is performed per DCI format must be reduced. If it is assumed that the number of times that BD is performed per DCI format is held constant, the number of times that BD is performed per DCI format is reduced to 4 (=24/6). In this case, the search space for DCI Format 1A may be composed of 12 PDCCH candidates and the search space for each of DCI Formats 1, 2A and 2 may be composed of four PDCCH candidates. Similarly, in the case of MaxBD=18, the number of PDCCH candidates for DCI Format 1A may be 9 and the search space for each of DCI Formats 1, 2A and 2 may include three PDCCH candidates.

Figure 11B:
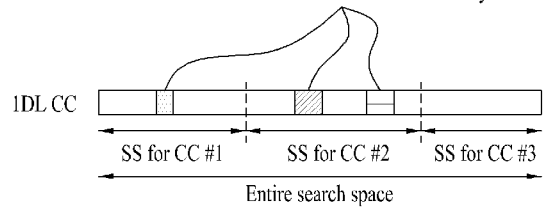

FIG. 11B shows an example of performing PDCCH transmission and BD in the case of search space sharing. For convenience, it is assumed that search spaces corresponding to three carriers (or CIF) are constituted. Each search space may correspond to any one of a linked DL CC-UL CC pair, a DL CC or a UL CC. In the drawing, it is assumed that the sizes of three search spaces may be different and the CCE aggregation levels of the PDCCH candidates in each search space may be different. For example, a search space for CC #1 may have a CCE aggregation level of 1 and a search space for CC #2/#3 may have a CCE aggregation level of 2, 4 or 8. In the drawing, a PDCCH (or PDCCH candidates) (CIF=CC #X) (X=1, 2, 3) may have the same DCI format or different DCI formats.

Case 1 of FIG. 11B shows the case where all search spaces are shared. That is, the PDCCH candidates of the search spaces for CC #1 to #3 have the same DCI payload size. Since all search spaces are shared, the PDCCH may be transmitted via PDCCH candidates of any one of the search spaces constituted per CC. That is, PDCCH candidates may be transmitted via any one of the search spaces constituted per CC. Referring to the drawing, the PDCCH (CIF=CC #2) is transmitted via the search space for CC #1 and the PDCCH (CIF=CC #1) and the PDCCH (CIF=CC #3) may be transmitted via the search space for CC #2. Accordingly, the UE performs BD with respect to the PDCCH candidates of the search spaces for CC #1 to #3 in order to find the PDCCH (CIF=CC #X) (X=1, 2, 3), on the assumption that the PDCCH (or PDCCH candidates) (CIF=CC #X) (X=1, 2, 3) may be transmitted via the search space for CC #1, the search space for CC #2 or the search space for CC #3.

Case 2 of FIG. 11B shows the case where the search spaces are partially shared. For convenience, it is assumed that the search spaces for CC #1/CC #3 are shared. That is, the PDCCH candidates of the search spaces for CC #1/CC #3 have the same DCI payload size and the PDCCH candidates of the search space for CC #2 have a different DCI payload size other than the PDCCH candidates of the search spaces for CC #1/CC #3. Referring to the drawing, the PDCCH (or PDCCH candidates) (CIF=CC #3) may be transmitted via any one of the shared search spaces. Accordingly, the UE performs BD with respect to only the PDCCH candidates of the search spaces for CC #1/#3 on the assumption that the PDCCH (or PDCCH candidates) (CIF=CC #3) may be transmitted via the search space for CC #1 or the search space for CC #3. In contrast, in order to confirm the PDCCH (CIF=CC #2), the UE performs BD only with respect to the PDCCH candidates of the search spaces for CC #2.

Figure 12:
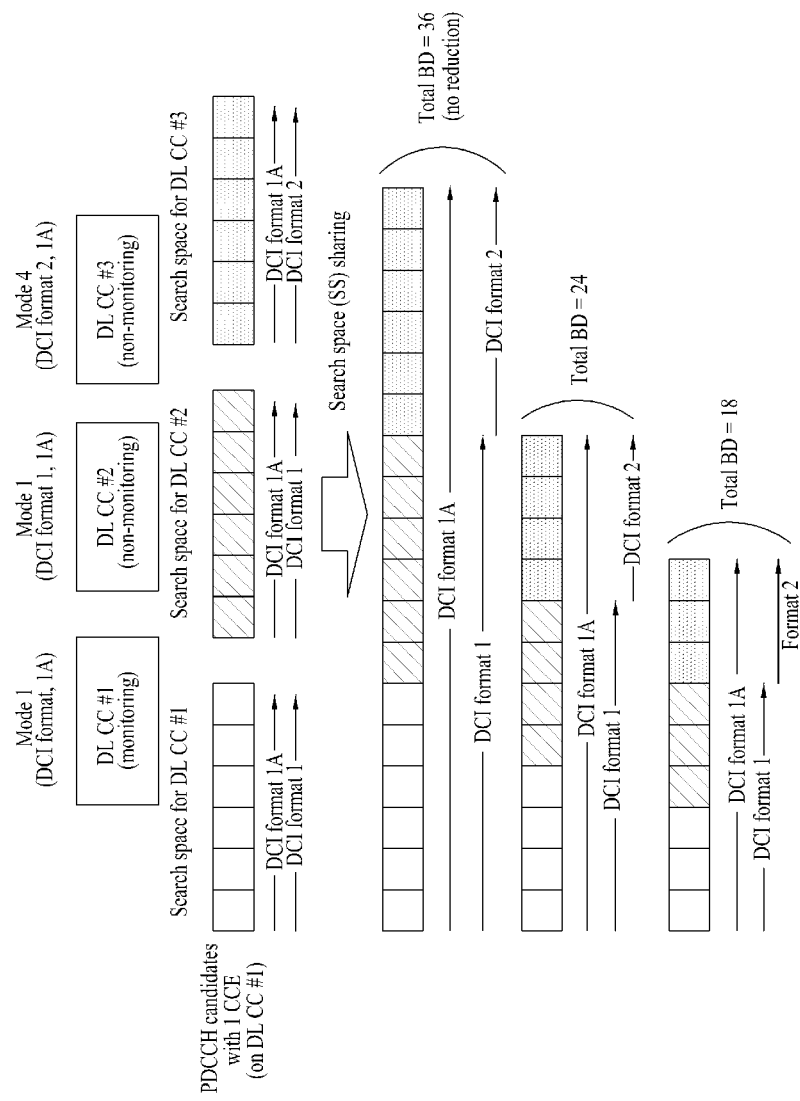

FIG. 12 shows a method of constituting PDCCH search spaces if the transmission modes of DL CCs are set to 1, 1 and 4 under the same condition as FIG. 11A.

Referring to FIG. 12, the BS constitutes the search spaces per CC and compares the DCI format sizes for all CCs. As a result of this comparison, the sizes of DCI Formats 1A for three DL CCs are the same, the sizes of DCI Formats 1 for two CCs are the same, and only the DCI format 2 has a different size. Accordingly, the BS unifies the three search spaces for DCI Format 1A and unifies the two search spaces for DCI Format 1. Accordingly, the BS may transmit DCI Format 1A (CIF=DL CC #1) via the PDCCH candidate of any one of a search space for DL CC #1, a search space for DL CC #2 and a search space for DL CC #3. Similarly, the BS may transmit DCI Format 1 (CIF=DL CC #X) (X=1, 2) via the PDCCH candidate of any one of the search space for DL CC #1 and the search space for DL CC #2. In contrast, since DCI Format 2 has a unique size, the search space for DCI Format 2 is not shared and are managed on a per CC basis. That is, DCI Format 2 (CIF=DL CC #3) may be transmitted via the search space for DL CC #3 alone.

A description will be made in greater detail in consideration of the maximum number MaxBD of times that BD is performed. In the case of MaxBD=36, the search spaces for the BD of DCI Format 1A include 18 (=6×3) PDCCH candidates similar to the example of FIG. 11A. The search space of DCI Format 1 may include 12 (=6×2) PDCCH candidates of the unified extended search space and the search space of DCI Format 2 may include six PDCCH candidates. If MaxBD is reduced to 24, the number of times that BD is performed per DCI format must be reduced. If it is assumed that the number of times that BD is performed per DCI format is kept constant, the number of times that BD is performed per DCI format is reduced to 4. In this case, the search spaces for DCI Formats 1A, 1 and 2 may be respectively composed of 12, 8 and 4 PDCCH candidates. Similarly, in the case of MaxBD=18, the number of PDCCH candidates for DCI Formats 1A, 1 and 2 may be 9, 6 and 3, respectively.

Figure 11B:
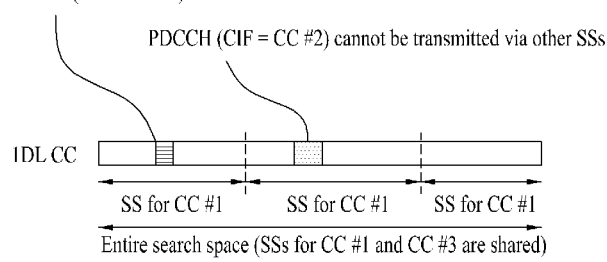
Figure 13:
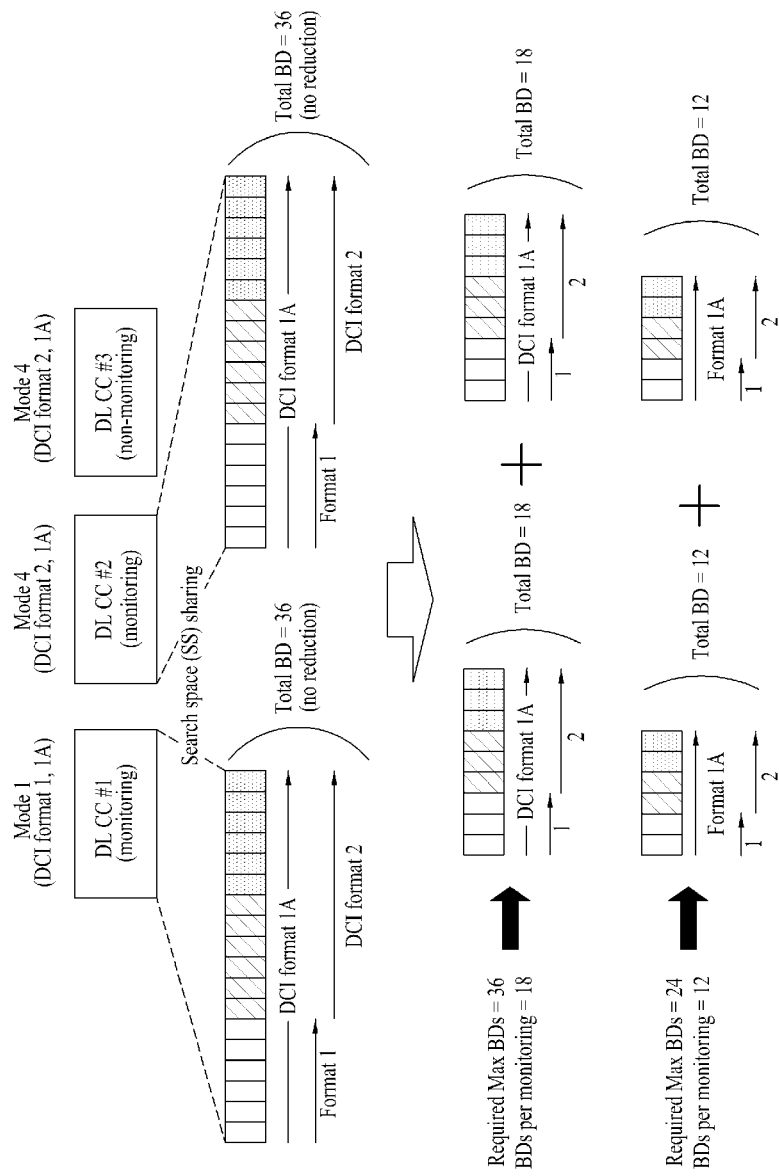
FIG. 13 is a diagram showing an example of constituting search spaces in the case where a plurality of monitoring DL CCs is used, according to an embodiment of the present invention.

FIG. 13 is a diagram showing another example of constituting PDCCH search spaces. Although the case where only one DL CC is set to a PDCCH monitoring DL CC is shown in FIGS. 11 to 12, a plurality of DL CCs may be set to a PDCCH monitoring DL CC set. If the number of CCs within the PDCCH monitoring CC set is L, as shown in FIG. 13, a method of limiting (MaxBD)/L to a maximally allowable number of times that BD is performed per monitoring CC or applying different weights to monitoring CCs (e.g., anchor DL CCs) (that is, differently limiting the maximally allowable number of times that BD is performed per monitoring CC) may be applied. The method of constituting the search spaces according to the number of monitoring CCs may be set by the BS in advance or may be automatically set by the UE under the MaxBD limitation.

According to the present method, if DCIs (formats) having the same size are present upon cross-CC scheduling, the sizes of the search spaces for the DCIs (formats) on the monitoring DL CCs may be set in proportion to the number of DCIs (formats). Accordingly, it is possible to increase a degree of freedom in PDCCH scheduling and to solve PDCCH blocking.

Embodiment 2: Search Space Reduction for Cross-CC Scheduled PDCCHs

For convenience, a PDCCH transmitted through a specific CC, which performs resource assignment with respect to a data channel of the corresponding CC, is defined as a self-CC PDCCH and a PDCCH, which performs resource assignment with respect to a data channel of a CC other than the corresponding CC, is defined as a cross-CC PDCCH. In this case, in order to reduce BD times on a specific CC and preferably on a PDCCH monitoring DL CC, both the search space for the self-CC PDCCH and the search space for the cross-CC PDCCH may be reduced. Preferably, the search space for the cross-CC PDCCH is reduced more than the search space for the self-CC PDCCH. Alternatively, the search space for the self-CC PDCCH may not be reduced and only the search space for the cross-CC PDCCH may be reduced.

Hereinafter, a description will be made in greater detail with reference to the drawings. For convenience, in the following drawings, the search space for the self-CC PDCCH is not reduced and only the search space for the cross-CC PDCCH is reduced. However, this is only exemplary and the following drawings and description may be applied to the case where the search space for the self-CC PDCCH and the search space for the cross-CC PDCCH are reduced, the case where the search space for the cross-CC PDCCH is reduced more than the search space for the self-CC PDCCH, etc.

Figure 14:
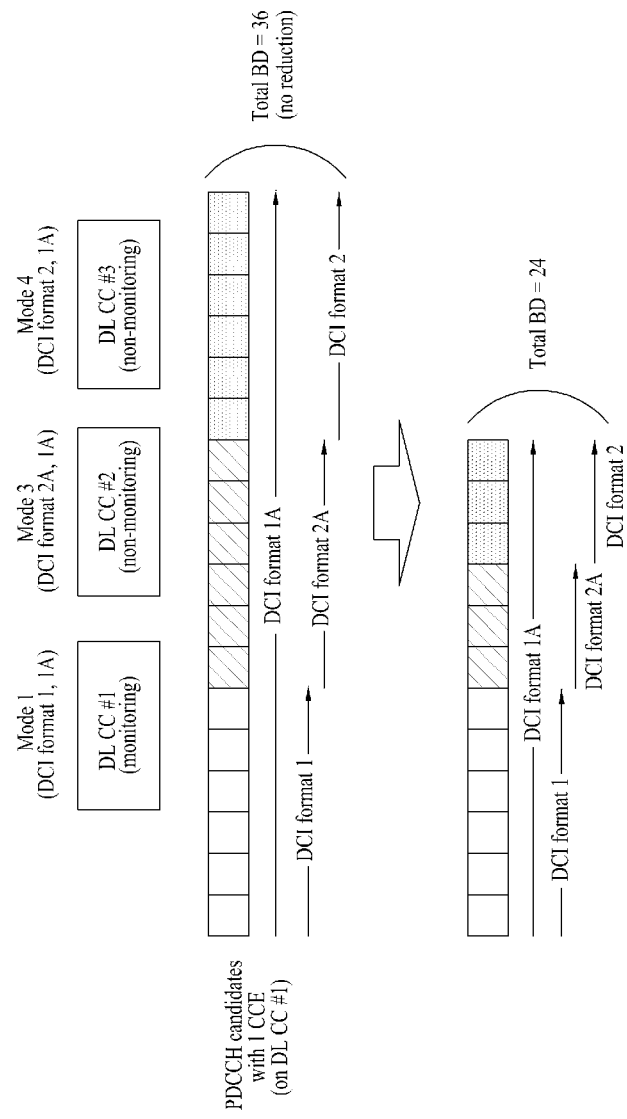
FIGS. 14 to 15 are diagrams showing examples of constituting search spaces in the case where the number of times that blind decoding can be performed is limited, according to an embodiment of the present invention.

FIG. 14 shows an example of constituting PDCCH search spaces if the transmission modes of DL CCs are 1, 3 and 4 in a state in which three DL CCs are aggregated. For convenience, it is assumed that the bandwidths of all CCs are the same and DL CC #1 is set to a PDCCH monitoring DL CC.

Referring to FIG. 14, the sizes of DCI Formats 1A for three CCs are the same and DCI Formats 1, 2A and 2 respectively have unique sizes. Accordingly, the search spaces for DCI Format 1A may be shared. In the drawing, MaxBD=36 indicates the case where the maximum number of times that BD is performed is not reduced. In this case, the number of times that BD is performed per DCI format becomes 6 (=36/6) and the search spaces for DCI Formats 1A, 1, 2A and 2 respectively include 18 (=6×3), 6, 6 and 6 PDCCH candidates. In contrast, if MaxBD is reduced to 24, the search space for the self-CC PDCCH may be maintained and the search space for the cross-CC PDCCH may be reduced. For example, a ratio of the size of the search space of the self-CC PDCCH to the size of the search space of the cross-CC PDCCH per CC (e.g., non-monitoring DL CC) may be set to 2:1. In this case, the search space of the self-CC PDCCH includes 12 PDCCH candidates and the search space of the cross-CC PDCCH per non-monitoring CC includes six PDCCH candidates. Accordingly, the number of times that BD is performed per DCI format of the monitoring CC becomes 6 (=12/2) and the number of times that BD is performed per DCI format of the non-monitoring CC becomes 3 (=6/2). In summary, since DCI Format 1A is used in the three CCs, the search space includes a total of 12 (=6+3+3) PDCCH candidates. In contrast, DCI Format 1 used only in the DL CC #1 (monitoring) may have six PDCCH candidates and DCI Formats 2A and 2 used only in DL CC #2 and #3 (non-monitoring) may have three PDCCH candidates.

Figure 15:
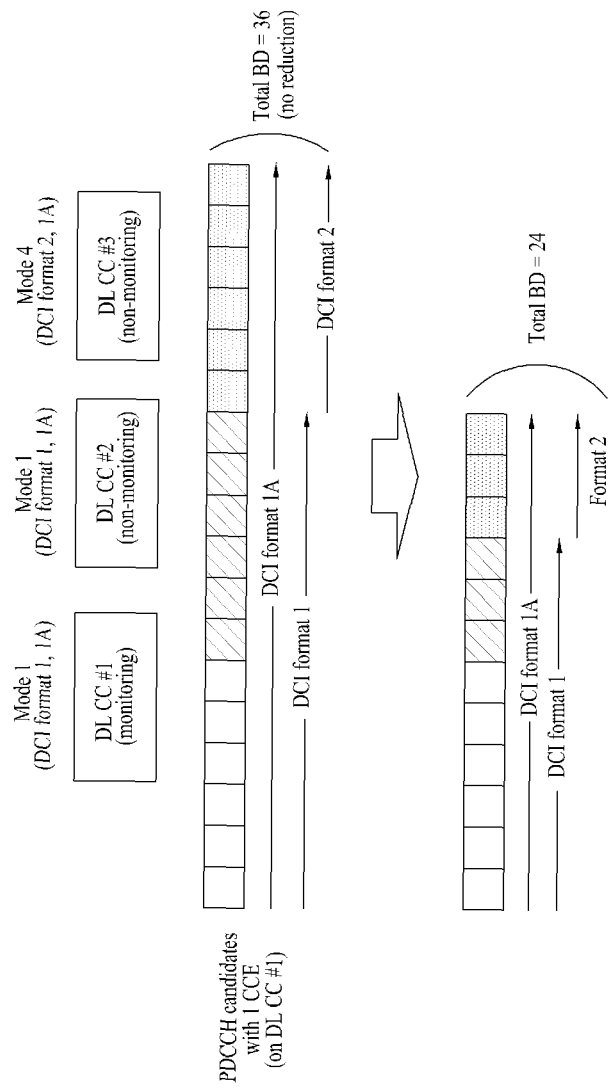

FIG. 15 shows an example of constituting search spaces for BD of the PDCCH if the transmission modes of the DL CCs are 1, 1 and 4 under the same condition as FIG. 14. For convenience, it is assumed that the bandwidths of all CCs are the same and DL CC #1 is set to a PDCCH monitoring DL CC.

Referring to FIG. 15, the sizes of DCI Formats 1A for three CCs are the same, the sizes of DCI Formats 1 for two CCs are the same, and only DCI Format 2 has a unique size. Accordingly, three search spaces for DCI Format 1A may be shared and two search spaces for DCI Format 1 may be shared. In the drawing, MaxBD=36 indicates that the maximum number of times that BD is performed is not reduced. In this case, the number of times that BD is performed per DCI format becomes 6 (=36/6) and the search spaces for DCI Formats 1A, 1, and 2 respectively include 18 (=6×3), 12 (=6×2) and 6 PDCCH candidates. In contrast, if MaxBD is reduced to 24, the search space for the self-CC PDCCH may be maintained and the search space for the cross-CC PDCCH may be reduced. For example, a ratio of the size of the search space of the self-CC PDCCH to the size of the search space of the cross-CC PDCCH per CC (e.g., non-monitoring DL CC) may be set to 2:1. In this case, the search space of the self-CC PDCCH includes 12 PDCCH candidates and the search space of the cross-CC PDCCH per non-monitoring CC includes six PDCCH candidates. Accordingly, the number of times that BD is performed per DCI format of the monitoring CC becomes 6 (=12/2) and the number of times that BD is performed per DCI format of the non-monitoring CC becomes 3 (=6/2). In summary, since DCI Format 1A is used in the three CCs, the search space includes a total of 12 (=6+3+3) PDCCH candidates. Similarly, since DCI Format 1 is used in the two CCs, the search space includes a total of 9 (=6+3) PDCCH candidates. In contrast, the DCI format 2 used only in the DL CC #3 (non-monitoring) may have three PDCCH candidates.

Embodiment 3: Information (e.g., DCI) Size Unification

In the present method, in order to increase a degree of freedom in control channel scheduling, a plurality of control information (e.g., DCI) formats having different sizes is grouped into a single size. That is, DCI size unification (or DCI size matching) may be performed such that the DCI formats have the same size. DCI size matching may be performed only in the case where a difference between the sizes of DCIs is equal to or less than a threshold. For example, DCI size matching may be performed only in the case where a difference between the sizes of DCIs is equal to or less than 3 bits. DCI size matching may be performed using bit padding. A padding bit (stream) may have a specific pattern or a specific value (e.g., 0). For example, the padding bit (stream) may have a value indicating a DCI format or a specific value for error checking.

If DCIs (formats) are grouped into a single size, the search spaces therefor may be shared as described in Embodiment 1. Accordingly, the search spaces may be extended in proportion to the number of DCIs (formats) grouped into the single size. The use/non-use of the present method and the parameter of the present method may be set by the BS per UE, UE group or cell or may be automatically set by the UE within the maximally allowable number (MaxBD) of times that BD is performed.

Figure 16:
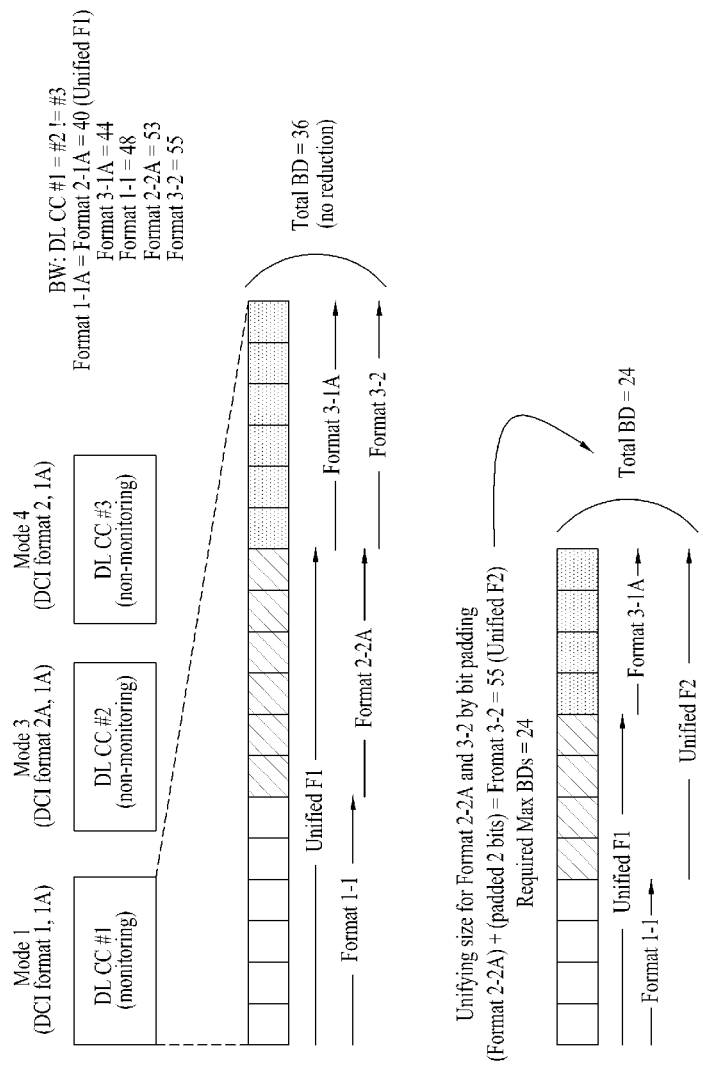
FIG. 16 is a diagram showing an example of constituting search spaces using DCI size unification according to an embodiment of the present invention.

FIG. 16 is a diagram showing an example of constituting search spaces for BD of a PDCCH, if the transmission modes of DL CCs are 1, 3 and 4 in a state in which three DL CCs are aggregated. It is assumed that the bandwidth of DL CC #1 is equal to that of DL CC #2, but is different from that of DL CC #3, and DL CC #1 is set to a PDCCH monitoring DL CC. Accordingly, the sizes of DCI Format 1A for two CCs (DL CC #1 and #2) are the same (Unified F1) and DCI Format 1A (Format 3-1A) for DL CC #3 and DCI Formats 1, 2A and 2 respectively have unique sizes. In the present example, it is assumed that a threshold for DCI size matching is set to 3 bits.

Referring to FIG. 16, if MaxBD is 36 bits and bit padding is not performed, the number of times that BD is performed per DCI format is 6 and the search spaces for Unified F1 (40 bits), Format 3-1A (44 bits), 1-1 (48 bits), 2-2A (53 bits) 3-2 (55 bits) respectively include 12 (=6×2), 6, 6, 6 and 6 PDCCH candidates. In contrast, if MaxBD is reduced to 24 and bit padding is performed, the DCI format satisfying the padding condition (that is, the difference between the sizes of the DCIs is 3 bits or less) is Format 2-2A and Format 3-2 ((Format 3-2: 55 bits)-(Format 2-2A: 53 bits)=2 bits<3 bits). Accordingly, Format 2-2A is padded with 2 bits and Format 2-2A and Format 3-2 may be grouped into a single size (Unified F2). Since the number of times that BD is performed per DCI format is 4, the search spaces for Unified F1, Format 1-1, Unified F2 and Format 3-1A may respectively include 8 (=4×2), 4, 8 (=4×2), 4 PDCCH candidates. As a result, two DCIs (Format 2-2A and Format 3-2) are grouped into one size, the search spaces, the sizes of which are doubled, are shared, and the degree of freedom in DCI scheduling can be substantially doubled.

FIG. 16 shows the case where the DCI size unification (or DCI size matching) is performed if the maximum number MaxBD of times that BD is performed is reduced. However, this is only exemplary and the DCI size unification (or DCI size matching) of the present invention is applicable irrespective of whether or not MaxBD is reduced.

DCI size matching to a single size may be performed even with respect to three or more DCIs in which a difference between DCI sizes is equal to or below a given threshold. DCI size matching (e.g., bit padding) per group may be performed with respect to a plurality of DCI groups. In addition, in order to prevent a separate Format Indicator (FI) bit from being added, CCs for which DCI formats are set within a DCI group may be made exclusive. If a plurality of DCI groups is possible, bit padding may be preferentially performed with respect to a group having a larger number of DCI formats or a group having a smaller sum of differences with a maximum DCI format size.

In addition, if DCI formats which are commonly set with respect to aggregated CCs are present, the DCI formats are grouped to a single size with respect to all CCs or only a part (preferably, one format) of the DCI formats may be grouped to a single size with respect to all CCs. Grouping into a single size includes, for example, bit padding and increase/decrease in scheduling granularity. In this case, the grouped DCI formats of the CCs may share one search space obtained by unifying the search spaces for the DCI formats. In other words, BD for the grouped DCI formats of the CCs may be commonly performed within one extended search space. The number of DCI formats commonly set to the aggregated CCs may be one or more.

Although the case in which the present invention is applied to DL CCs has been illustrated thus far, the method of constituting the PDCCH search spaces in consideration of UL CCs will now be described in detail. Prior to description, it should be noted that the size of each search space constituted per DL/UL CC pair, DL CC or UL CC may be determined in proportion to the maximum number of PDCCHs transmittable via the search space or may be given weights. For convenience, although one DCI format per DL CC or UL CC is set according to transmission mode in the following drawing, a plurality of DCI formats (two or more) may be set. Like DCI Format 0/1A of the conventional LTE system, a DL/UL common DCI format may be set.

In the search spaces which consider a DL/UL CC, [Scheme 1] a search space for a DL CC and a search space for a UL CC may be independently constituted or [Scheme 2] one search space may be constituted per linked DL/UL CC pair.

Figure 17:
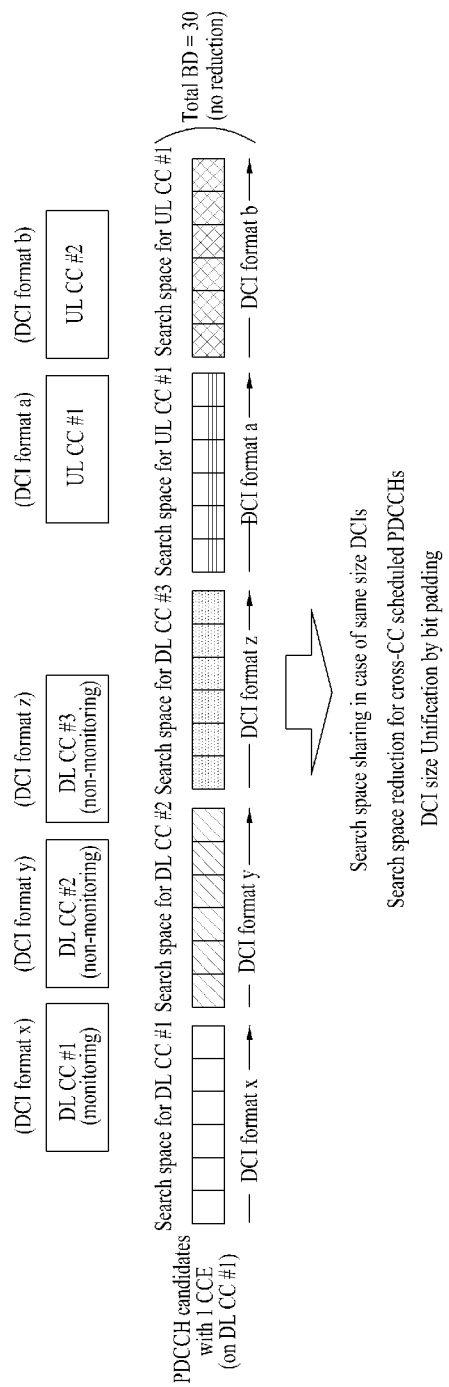
FIGS. 17 to 20 are diagrams showing an example of a search space in a carrier aggregation state according to an embodiment of the present invention.

[Scheme 1] Case where the Search Space for the DL CC and the Search Space for the UL CC are Independently Constituted FIG. 17 shows an asymmetric CC aggregation case in which three DL CCs and two UL CCs are aggregated. Referring to FIG. 17, a search space for each DL CC and a search space for each UL CC may be independently constituted. In this case, DCIs (formats) having the same size irrespective of DL/UL may share search spaces corresponding to CCs as described in Embodiment 1. In addition, in order to decrease the number of times that BD is performed and increase degree of freedom in scheduling, Embodiments 2 and 3 may be applied together/separately.

[Scheme 2] Case where the Search Space is Constituted Per Linked DL/UL CC Pair.

The search spaces are constituted per linked DL/UL CC pair. In the case of asymmetric CC aggregation in which the number of DL CCs and the number of UL CCs are different, non-linked CCs may constitute search spaces per DL CC or UL CC. As a result, the total number of constituted search spaces may correspond to the greater of the total number of DL CCs and the total number of UL CCs. The DL/UL DCIs (formats) having the same size share search spaces corresponding to CC pairs as described in Embodiment 1. In addition, in order to decrease the number of times that BD is performed and increase degree of freedom in scheduling, Embodiments 2 and 3 may be applied together/separately.

Figure 18:
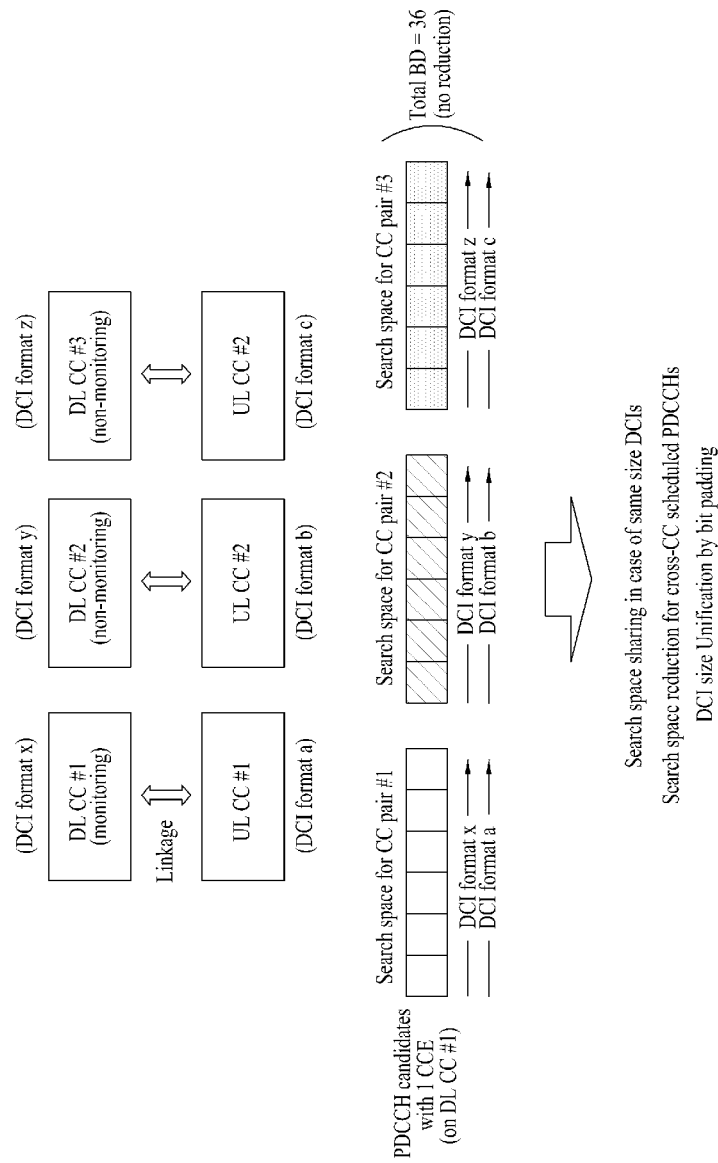

1-a) Symmetric CC aggregation case (that is, the number of DL CCs>the number of UL CCs): The search spaces are constituted per linked DL/UL CC pair (see FIG. 18).

Figure 19:
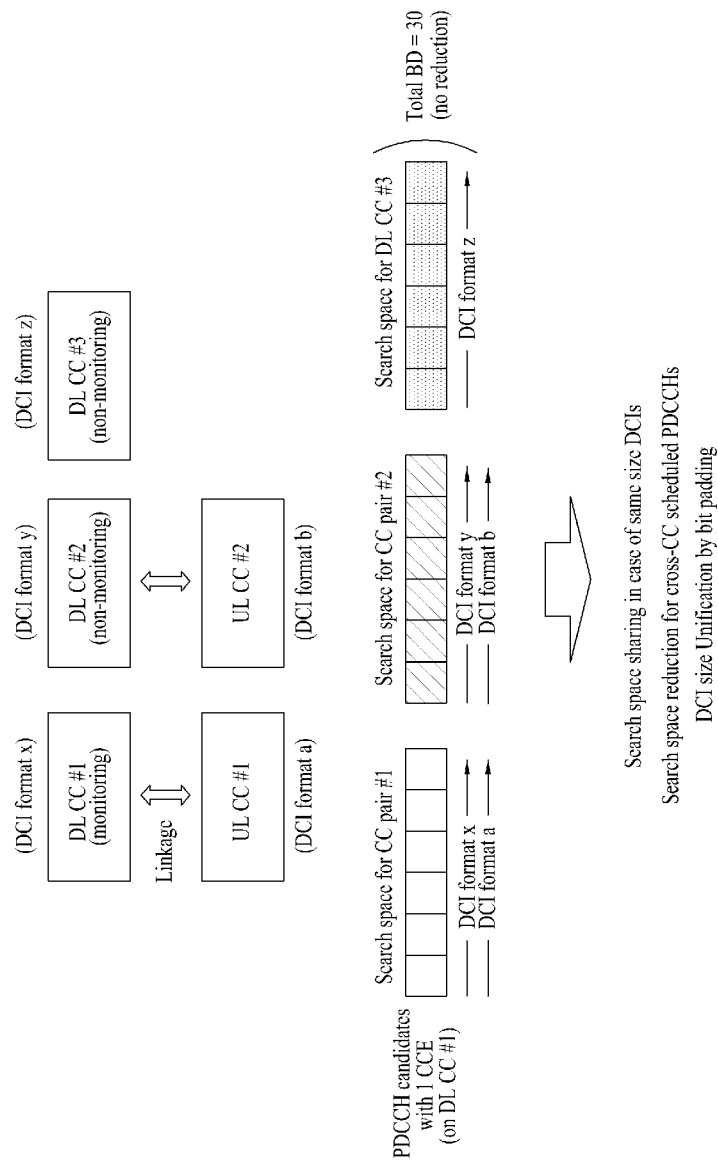

1-b) DL-heavy CC aggregation case (that is, the number of DL CCs<the number of UL CCs): The search spaces are constituted per linked DL/UL CC pair and the search spaces are constituted per DL CC with respect to the non-linked DL CC (see FIG. 19).

1-c) UL-heavy CC aggregation case (that is, the number of DL CCs<the number of UL CCs): The search spaces are constituted per linked DL/UL CC pair and the search spaces are constituted per UL CC with respect to the non-linked UL CC.

2) If the search space constituted per non-linked CC (DL or UL) is type-A SS and the search space constituted per linked DL/UL CC pair is type-B SS, the size of type-A SS may be equal to or less than that of type-B SS.

Figure 20:
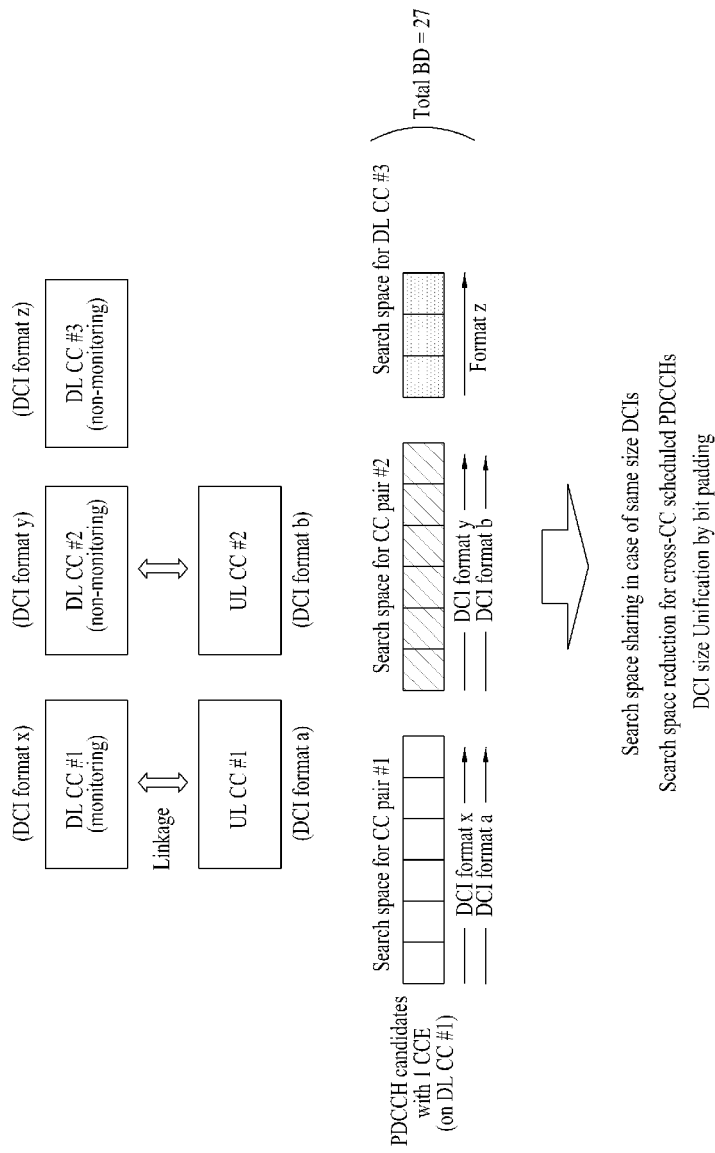

2-a) If it is assumed that a maximum of one PDSCH/PUSCH per CC can be scheduled irrespective of DL/UL, as shown in FIG. 20, since a maximum of one PDCCH can be transmitted via type-A SS (DL or UL scheduling) and a maximum of two PDCCHs (DL+UL scheduling) can be transmitted via type-B SS, a ratio of the size of type-A SS to the size of type-B SS may be set to 1:2.

3) DCI formats having the same size irrespective of DL/UL share the unified search space as described in Embodiment 1.

4) In order to decrease BD times and increase a degree of freedom in scheduling, Embodiments 2 and 3 may be applied together/separately.

Although, in the present invention, cross-CC scheduling for all DL/UL CCs assigned to the UE from the PDCCH monitoring DL CC is possible, cross-CC scheduling may be set to be performed with respect to a limited number of DL/UL CC groups. The setting of the cross-CC scheduling may vary according to PDCCH monitoring DL CCs. If a plurality of PDCCH monitoring DL CCs is used, DCIs (formats) having the same size share corresponding search spaces on the respective monitoring CCs. If the DCIs (formats) having the same size are present between the monitoring CCs, the corresponding search spaces may be shared. The search spaces may be shared between the monitoring CCs without limitation in setting of cross-CC scheduling. In order to reduce BD times, the sizes of the search spaces shared between the DCIs (formats) having the same size may be further reduced. For example, if the sizes of the plurality of DCIs (formats) are the same, only a part (one) of the search spaces for the DCIs (formats) may be assigned as the search space shared between the DCIs (formats) or a plurality of search spaces for DCIs (formats) is collectively reduced so as to constitute one shared search space. In addition, the ratio of the size of the search space shared between the DCIs (formats) having the same size may be set in proportion to the number of DCIs (formats) sharing the corresponding space.

Simulation

PDCCH blocking probability was evaluated when SS sharing for the same size DCI formats is applied or not. Simulation assumption is provided in Table 5. CCE aggregation level distribution for PDCCH scheduling (%) is also provided in Table 6.

TABLE 5

| Parameter | Assumption |
| --- | --- |
| BW of PDCCH CC | 10 MHz (50 RBs), 20 MHz (100 RBs) |
| Total number of CCEs (4Tx DL, CIF = 3) | 37 (10 MHz), 76 (20 MHz) |
| CCEs assumed to be occupied by common PDCCHs | 8 CCEs (out of 16 CCEs) |
| Aggregated CCs (i.e. scheduled PDCCHs) per UE | 2 CCs |
| Size of SS at CCE aggregation level 1/2/4/8 | 6, 12, 8, 16 CCEs (as in Rel-8) |
| CCE aggregation level for different PDCCHs of a UE | Independent |
| DCI format size for aggregated CCs of a UE | Same |
| Simulation time | 50000 subframes |
| SS assignment for each CC | Independent (can be overlapped) |

TABLE 6

| 1 CCE | 2 CCE | 4 CCE | 8 CCE |
| --- | --- | --- | --- |
| 56 | 29 | 12 | 3 |

Figure 21:
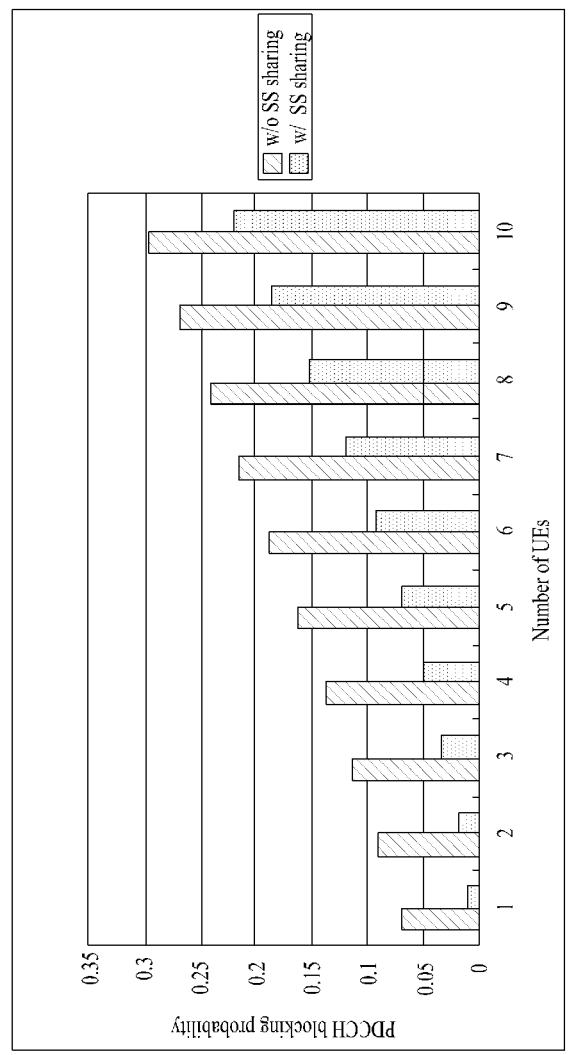
FIGS. 21 to 22 are diagrams showing simulation results when search spaces are shared, according to an embodiment of the present invention.
Figure 22:
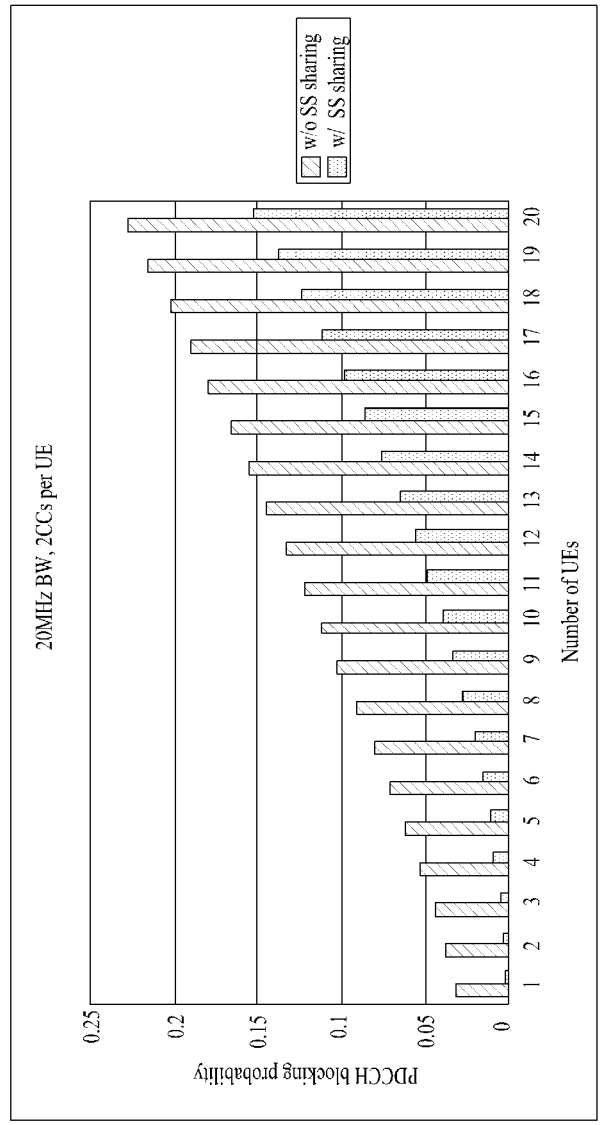

FIGS. 21 and 22 show PDCCH blocking probability according to SS sharing when 2 CCs are aggregated per UE, and BWs of PDCCH CC are 10 MHz, 20 MHz, respectively. As shown in the figures, it is observed that overall PDCCH blocking probability can be largely reduced (more than 25% and 33% reduction in 10 MHz and 20 MHz, respectively) by applying the SS sharing compared to the case of no SS sharing.

Figure 23:
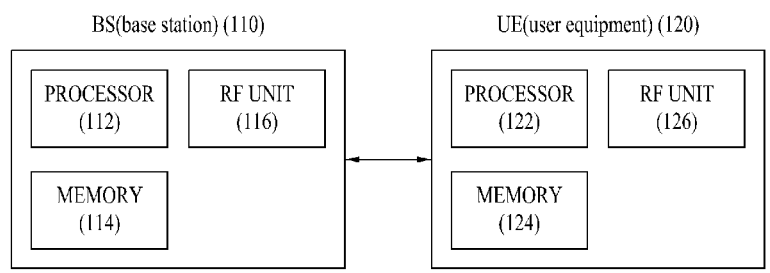
FIG. 23 is a diagram illustrating a BS and a UE, which can be applied to the embodiment of the present invention.

FIG. 23 is a diagram illustrating a base station and a user equipment, which can be applied to the embodiment of the present invention.

Referring to FIG. 23, the wireless communication system includes a base station (BS) 110 and a user equipment (UE) 120. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention can be used in wireless communication apparatuses such as a user equipment, a relay station, a base station and the like.

What is claimed is:

1. A method of receiving a control channel at a user equipment configured with a carrier indicator field (CIF) in a wireless communication system, the method comprising:
   receiving a subframe including a plurality of search spaces, wherein each of the plurality of search spaces is configured for a respective component carrier indicated by a respective CIF value; and
   monitoring control channel candidates in the plurality of search spaces,
   wherein the control channel candidates correspond to two or more CIF values for a downlink control information (DCI) format size, and
   wherein one of the control channel candidates with the DCI format size is monitored in any search space corresponding to any of the CIF values for the DCI format size.

2. The method of claim 1, wherein each of the control channel candidates further includes a cyclic redundancy check (CRC) scrambled by an identifier.

3. The method of claim 2, wherein the identifier includes a cell radio network temporary identifier (C-RNTI).

4. The method of claim 1, wherein the control channel candidates are discriminated using the CIF values.

5. A method of transmitting at a base station in a wireless communication system, the method comprising:
   generating control channel candidates, wherein each of the control channel candidates includes a respective carrier indicator field (CIF) value; and
   transmitting the control channel candidates via a plurality of search spaces in a subframe,
   wherein the control channel candidates correspond to two or more CIF values for a downlink control information (DCI) format size, and
   wherein one of the control channel candidates with the DCI format size is monitored in any search space corresponding to any of the CIF values for the DCI format size.

6. The method of claim 5, wherein each of the control channel candidates further includes a cyclic redundancy check (CRC) scrambled by an identifier.

7. The method of claim 6, wherein the identifier includes a cell radio network temporary identifier (C-RNTI).

8. The method of claim 5, wherein the control channel candidates are discriminated using the CIF values.

9. A user equipment configured with a carrier indicator field (CIF) for operating in a wireless communication system, the user equipment comprising:
   a radio frequency (RF) unit; and
   a processor,
   wherein the processor is configured to receive a subframe including a plurality of search spaces, wherein each of the plurality of search spaces is configured for a respective component carrier indicated by a respective CIF value, and to monitor control channel candidates in the plurality of search spaces,
   wherein the control channel candidates correspond to two or more CIF values for a downlink control information (DCI) format size, and
   wherein one of the control channel candidates with the DCI format size is monitored in any search space corresponding to any of the CIF values for the DCI format size.

10. The user equipment of claim 9, wherein each of the control channel candidates further includes a cyclic redundancy check (CRC) scrambled by an identifier.

11. The user equipment of claim 10, wherein the identifier includes a cell radio network temporary identifier (C-RNTI).

12. The user equipment of claim 9, wherein the control channel candidates are discriminated using the CIF values.

13. A base station for use in a wireless communication system, the base station comprising:
   a radio frequency (RF) unit; and
   a processor,
   wherein the processor is configured to generate control channel candidates, wherein each of the control channel candidates includes a respective carrier indicator field (CIF) value, and to transmit the control channel candidates via a plurality of search spaces in a subframe,
   wherein the control channel candidates correspond to two or more CIF values for a downlink control information (DCI) format size, and
   wherein one of the control channel candidates with the DCI format size is monitored in any search space corresponding to any of the CIF values for the DCI format size.

14. The base station of claim 13, wherein each of the control channel candidates further includes a cyclic redundancy check (CRC) scrambled by an identifier.

15. The base station of claim 14, wherein the identifier includes a cell radio network temporary identifier (C-RNTI).

16. The base station of claim 13, wherein the control channel candidates are discriminated using the CIF values.

* * * * *